US005635548A

United States Patent [19]
Kittle et al.

[11] Patent Number: 5,635,548
[45] Date of Patent: Jun. 3, 1997

[54] POWDER COATING COMPOSITIONS AND THEIR USE

[75] Inventors: Kevin J. Kittle, Co. Durham; Paul F. Rushman, Northumberland, both of United Kingdom

[73] Assignee: Courtaulds Coatings (Holdings) Limited, United Kingdom

[21] Appl. No.: 432,119

[22] PCT Filed: Nov. 5, 1993

[86] PCT No.: PCT/GB93/02288

§ 371 Date: Jun. 12, 1995

§ 102(e) Date: Jun. 12, 1995

[87] PCT Pub. No.: WO94/11446

PCT Pub. Date: May 26, 1994

[30] Foreign Application Priority Data

Nov. 6, 1992 [GB] United Kingdom ............... 9223300

[51] Int. Cl.$^6$ ............... C09J 3/20; C09C 3/10; C09D 5/03; C08K 3/20
[52] U.S. Cl. ............... 523/220; 427/475; 428/336; 428/413; 428/480; 428/512; 524/403; 524/413; 524/423; 524/425; 524/427; 524/430; 524/432; 524/433; 524/437; 524/445; 524/447; 524/449; 524/451; 524/414; 524/405; 524/904

[58] Field of Search ............... 523/220; 524/400, 524/406, 413, 430, 432, 433, 437, 492, 493, 904, 425, 427, 445, 447, 449, 451, 414, 405; 427/475; 428/335, 336, 413, 480, 522

[56] References Cited

U.S. PATENT DOCUMENTS 5,319,001  6/1994  Morgan et al. ............... 523/220
5,470,893  11/1995  Sinclair-Day et al. ............... 523/220

*Primary Examiner*—Peter A. Szekely
*Attorney, Agent, or Firm*—Nixon & Vanderhye

[57] ABSTRACT

A power coating composition comprises at least one film-forming polymeric material and has dry-blended therewith two or more dry-blended additives selected from solid, particulate, inorganic, water-insoluble materials which may be ceramic or mineral materials and/or may be oxides, mixed oxides, hydrated oxides, hydroxides, oxide-hydroxides or oxysalts of metals and metalloids, at least 95% by volume of the powder coating composition having a particle size not exceeding 50 microns.

35 Claims, 10 Drawing Sheets

Rq = 0.31

Rq = 0.09

$Rq = 0.124$

POWDER COATING COMPOSITIONS AND THEIR USE

This invention relates to powder coating compositions and to their use.

Powder coatings form a rapidly growing sector of the coatings market. Powder coatings are solid compositions which are generally applied by an electrostatic spray process in which the powder coating particles are electrostatically charged by the spray gun and the substrate is earthed or oppositely charged. Charging of the powder in the spray gun is effected by means of an applied voltage or by the use of friction (tribo-charging). The applied composition is then heated to melt and fuse the particles and to cure the coating. The powder coating particles which do not adhere to the substrate can be recovered for re-use so that powder coatings are economical in use of ingredients. Also, powder coating compositions are generally free of added solvents and, in particular, do not use organic solvents and are accordingly non-polluting.

Powder coating compositions generally comprise a solid film-forming resin, usually with one or more colouring agents such as pigments, and optionally also contain one or more performance additives. They are usually thermosetting, incorporating, for example, a film-forming polymer and a corresponding curing agent (which may itself be another film-forming polymer). Powder coating compositions are generally prepared by intimately mixing the ingredients (including colouring agents and performance additives) for example in an extruder, at a temperature above the softening point of the film-forming polymer(s) but below a temperature at which significant pre-reaction would occur. The extrudate is usually rolled into a flat sheet and comminuted, for example by grinding, to the desired particle size. The particle size distribution required for most commercial electrostatic spray apparatus is between 10 and 120 microns, with a mean particle size within the range of 15 to 75 microns, preferably 25–50 microns. Such powders are normally applied at film thicknesses of 40–50 microns and upwards.

Using powder coatings of such conventional particle size distribution it is difficult to apply thin film coatings of, say, 30 microns or less, for which there is an increasing demand in certain sectors of the powder coatings market, to achieve a uniform opacity and an aesthetically pleasing appearance, particularly in a gloss white coating. The achievement of such results is possible only within a restricted range of powder chemistries, with the best performance generally being obtained with polyurethane powders using blocked isocyanates. To achieve coatings of less than 20 microns with a uniform opacity and an aesthetically pleasing appearance is very difficult if not impossible. The problems encountered ("orange-peel" imperfections, etc.) are considered to be attributable to the relatively large size of the majority of the particles in powder coating compositions of conventional particle size distribution.

In addition to the increasing demands within the powder coatings market itself, it is also recognised that the inability of powder coatings reliably and routinely to achieve film thicknesses of 30 microns or less with aesthetically pleasing appearance is one of the factors preventing further substitution of solvent-based "wet" paints by powder coatings.

It is believed that the problems of achieving satisfactory thin film powder coatings could in principle be alleviated with the use of powder coating compositions of a finer particle size. There are problems, however, in the fluidisation, handling and application of relatively small particles, especially particles which are 10 microns in diameter or less. Such problems become more pronounced as the proportion of fine particles increases, and powder coating compositions have hitherto generally been manufactured so as to comprise not more than 10% by volume of particles which are 10 microns in diameter or less.

It is an object of the present invention to alleviate the problems of fluidisation, handling and application of fine particles, especially particles which are 10 microns in diameter or less, so as to permit a significant increase in the proportion of such particles which can be tolerated and thereby facilitate the formation of thin coatings of good quality appearance. A measure of the fluidisation and handling behaviour (sprayability) of a powder coating composition can be obtained by determining its so-called fluidity index (or "spray factor") using the AS 100 Flowmeter manufactured by SAMES of Grenoble.

In addition to problems of fluidity and related handleability and performance characteristics, the present invention is also concerned with the prevention or alleviation of various other problems attributable to undesirable differential and premature electrostatic charging of the powder particles caused by spontaneous tribocharging during mixing and handling of the powder compositions. An important problem resulting from differential electrostatic charging is undesirable variation in deposition efficiency at different application voltages, leading to non-uniform and inconsistent coating of substrates. There is also so-called electrostatic segregation, that is to say, the unwanted separation or differential deposition of two components of a powder coating composition onto different portions of the substrate during electrostatic spray coating.

The present invention provides a powder coating composition which comprises at least one film-forming polymeric material and which has dry-blended therewith two or more additives selected from solid, particulate, inorganic, water-insoluble materials which may be ceramic or mineral materials and/or may be oxides, mixed oxides, hydrated oxides, hydroxides, oxide-hydroxides or oxysalts of metals and metalloids, at least 95% by volume of the powder coating composition having a particle size of less than 50 microns. By using combinations of dry-blended additives in accordance with the invention it is possible to alleviate, or even prevent, the problems of fluidisation, handling and application of fine particles (especially those of 10 micron diameter or less) as outlined above and also to alleviate other problems attributable to differential and premature electrostatic charging of the powder particles. The effect obtained in any individual case will depend primarily on the following parameters:

1) The nature of the additives;
2) The amount of each additive in the powder coating composition; and
3) The particle size of the powder coating components.

In general, in a powder coating composition of the invention, at least 20% by volume of the powder coating particles will have a diameter of less than 10 microns, and in principle the proportion by weight of such particles may be at least 30%, 40% or 50%, with the possibility of still higher contents of such particles of at least 60, 70, 80, 90 or even 100% by weight in the limiting case. Powder coating compositions having such particle size distributions can be obtained by conventional milling, but fluid energy jet milling is the preferred manufacturing method.

The relevant parameters of the particle size distribution of a powder coating composition can be measured by a number of methods which will report the fraction of particles falling within a given size range by weight, volume or number of particles within that range. The figures relating to weight or volume of particles within a range are those which are most commonly used, and it is obvious that for a given powder the weight fraction or volume fraction within a given size range are equivalent since they are related by a constant density. The present specification refers throughout to distribution by volume. Such distributions can be determined by any of a variety of laser light-scattering devices, the Cis-1, (manufactured by Galia), the Helos (manufactured by Sympatec), and the Mastersizer X (manufactured by Malvern) being preferred examples. Any comparable device may, however, be used.

In a powder coating composition of the invention, at least 95% by volume of the powder coating particles, and advantageously at least 99% by volume, have a diameter of less than 50 microns. Preferably, substantially all of the particles will meet that size criterion. Preferably, one or more of the following characterising criteria is satisfied:

(a) 95–100% by volume<50 microns;
(b) 45–100% by volume<20 microns;
(c) 20–100% by volume<10 microns;
(d) 5–70% by volume<5 microns;
(e) $d(v)_{50}$ (diameter in microns below which 50% of the volume distribution of the particles in a sample is found) in the range 1.3 to 20 microns.

In particularly preferred compositions, each of the characterising criteria (a) to (e) is met.

Mention may also be made of compositions in which the particle size distribution by volume is as follows:

| ≧95%, | or | ≧99%, | or | 100% |
|---|---|---|---|---|
| <45μ | | <45μ | | <45μ |
| <40μ | | <40μ | | <40μ |
| <35μ | | <35μ | | <35μ |
| <30μ | | <30μ | | <30μ |
| <25μ | | <25μ | | <25μ |
| <20μ | | <20μ | | <20μ |
| <15μ | | <15μ | | <15μ |
| <10μ | | <10μ | | <10μ |

The capability of handling and applying very fine powder coating materials (powders containing a high percentage of particles which are 10 microns or less) offers the possibility of applying relatively thin coatings of 30 microns or less with a uniform opacity, and an overall appearance at least equivalent to a conventional powder coating applied at 50–60 microns.

A surprising further advantage obtainable by means of the invention is that by using very fine powder coating materials a greatly enhanced surface appearance, of the applied coating after curing, can be obtained. This enhanced surface appearance, obtainable especially where at least 50% by volume of the powder coating materials are <10 microns and at least 99% are <20 microns, can best be described as an almost total absence of orange peel in conjunction with a very flat surface having high gloss and high distinction of image. This lack of orange peel can be confirmed by measuring the surface profile and determining a conventional roughness quotient (as explained in the experimental section hereinafter).

The enhanced surface appearance can be obtained at a film thickness of 30 microns, but is also achievable at film thickness down to 15 microns or even 10 microns. At film thicknesses below 15 microns there can be problems with opacity in certain colours, and especially in the case of white coatings. Coating thicknesses of less than 10 microns are seldom used for decorative purposes except, for example, in the metal can coating market. Also in this market, non-pigmented coatings of the order of 5 microns film thickness or less are employed. A benefit of the present invention is that such film thicknesses can be achieved with powder coating compositions.

Fine powder coating compositions according to the invention can also be applied to give the enhanced surface appearance at relatively high film weights, say, up to 50 microns or even higher (say, for example, up to 80–90 microns). It should be noted, however, that there is in general an increasing risk of disruption of the film surface at high film weights (believed to be attributable to back-ionisation phenomena).

A related benefit of the invention is the possibility of obtaining "bit-free" coatings. If the maximum particle size of the powder coating material is close to or less than the desired film thickness, then the possibility of bit formation in the film caused by some defect in the extrusion or milling phase of the process can be avoided. Thus, for example, to obtain a bit-free film at 30–35 microns, the powder coating material would be ground such that 100% of the product was below 35 microns.

There is also the possibility of achieving a third colour in the applied coating by electrostatic spraying of a composition which comprises powder coating components of two (or more) different colours. GB 2226824A (EP 0372860A) discloses, inter alia, that by mixing two (or more) differently coloured powder coating compositions of sufficiently small particle sizes, for example having a particle size distribution such that substantially all the particles have their largest dimension below 10 microns, a powder coating composition having a different colour from each of the components could be achieved. That Specification also discloses that the individual powder coating compositions having a particle size distribution such that substantially all the particles were below 10 microns, and mixtures thereof, are not readily air fluidisable, and in particular are not fluidisable by commercial electrostatic spray apparatus. It was accordingly proposed that the particles needed to be agglomerated to form a powder coating composition of a larger particle size distribution to achieve fluidity in air, and allow for application by commercial electrostatic spray apparatus.

According to one aspect of the present invention, very fine powder coating materials, for example, where substantially all the particles have their largest dimension below 10 microns, can be rendered air fluidisable. A surprising further advantage obtainable by the present invention is that, when mixtures of two (or more) differently coloured very fine powder coating materials are made, not only are they air fluidisable, but they can be applied using commercial electrostatic spray apparatus to give a film which will be perceived visually as an homogeneous colour with no evidence of the individual constituent colours, and no evidence of electrostatic separation of these colours. In addition, the resulting films show enhanced surface appearance.

An additive according to the invention may be a compound of a metal from Group 2 of the periodic table, for example, calcium oxide; a compound of a metal from Group 12, for example, zinc oxide; a compound of a d-block transition metal, such as a metal from Group 4, for example, zirconia or hafnia, or a compound of a metal from Group 6, for example, molybdenum trioxide or tungsten trioxide; a compound of a metal from Group 13, for example, alumina or aluminium hydroxide; a compound of a p-block metal or metalloid such as from Group 14, for example silica; or a compound of a rare earth metal, for example, lanthanum oxide or cerium oxide.

An additive which is an oxide may be a basic oxide, for example, calcium oxide, or an amphoteric oxide, for example, alumina or zinc oxide.

An additive which is an oxysalt may be a silicate (for example, aluminium silicate), a borate, a phosphate (for example, magnesium phosphate), a carbonate (for example, magnesium carbonate) or a sulphate.

In the case of an additive which is an oxide, oxyhydroxide or hydroxide of aluminium, it is believed that any of the main structural types may be used, that is to say:

| | |
|---|---|
| $\alpha$-$Al_2O_3$ | Corundum |
| $\alpha$-AlO(OH) | Diaspore |
| $\alpha$-Al(OH)$_3$ | Bayerite |
| $\gamma$-$Al_2O_3$ | |
| $\gamma$-AlO(OH) | Boehmite |
| $\gamma$-Al(OH)$_3$ | Gibbsite |

An additive which is silica preferably comprises fumed silica.

Preferred combinations of additives for use in accordance with the invention include the following:

(A) An additive selected from alumina, aluminium hydroxide, calcium oxide, silica, zinc oxide, zirconia, molybdenum trioxide, ceric oxide and tungsten trioxide, preferably alumina or silica, more especially alumina; and (B) An additive selected from aluminium hydroxide, aluminium silicate, zirconia, zinc oxide, silica and calcium oxide, preferably aluminium hydroxide.

Whilst the majority of additive combinations chosen from (A) and (B) above may in general be expected to be effective over the whole size range of powder coating compositions for use in accordance with the invention, combinations including molybdenum trioxide, ceric oxide or tungsten trioxide as the sole component(s) (A) will in general be less suitable, the higher the content of particles of less than 10 microns, and there may be cases towards the lower end of the size range in which the effect of those particular additives is too small to be significant.

Preferably, one of the additives is alumina (aluminium oxide) in any combination of additives for use according to the invention.

An especially preferred combination of additives according to the invention comprises alumina and aluminium hydroxide. Another preferred combination comprises alumina and aluminium silicate.

Preferably, one or each dry-blended additive is an oxide or mixed oxide. Preferred combinations of additives include an oxide or mixed oxide with another oxide or mixed oxide, and an oxide or mixed oxide with a hydrated oxide, hydroxide or oxide-hydroxide. In such preferred combinations of additives each additive may be any of those specifically mentioned herein or may be a material belonging to any of the classes specifically mentioned herein.

There may be more than two of the said dry-blended additives in a composition according to the invention. Thus, for example, there may be two (or more) additives from the groups designated (B) above in conjunction with an additive from the corresponding group designated (A). Preferably, however, a composition according to the invention comprises only two dry-blended additives as defined.

The total content of the dry-blended additives incorporated with a powder coating composition of the invention will in general be in the range of from 0.01 to 10% by weight (based on the total weight of the composition without the additives), advantageously at least 0.05% by weight and preferably at least 1.0% by weight. A total additive content of over 10% by weight may in principle be used, but will have an increasingly detrimental effect on the surface appearance of the finished coating.

In the case in which one of the dry-blended additives is alumina, the proportion of alumina incorporated may be at least 0.01% by weight (based on the total weight of the composition without the additives), advantageously at least 0.02% by weight and generally in the range of from 0.2 to 0.4% by weight. Because of its relatively intense effect on electrostatic phenomena, the proportion of alumina will not normally exceed 1.0% by weight, but higher proportions may in principle be appropriate in special circumstances, for example in the case of a powder coating composition with a very broad particle size distribution or one in which a mixture of two powders is used, one of which is composed of particles which are substantially all less than 10 microns, and the other with a generally coarser distribution. In such circumstances, it is conceivable that the proportion of alumina incorporated might be as high as 2.5% or even 5% by weight. An alumina content of up to 10% by weight may in principle be used, but will have an increasingly detrimental effect on the surface appearance of the finished coating.

It is believed that, in general, for a given quantity of powder coating composition, the amount of each additive that will be needed in order to produce particular performance characteristics will be higher, the smaller the particle size of the composition, because it is believed that the amount of additive needed for a given quantity of powder is dependent on the number of particles present.

Typically, in the case in which one of the additives is alumina, the content of the other additive(s), for example, those designated (B) above, will not exceed 5% based on the total weight of the composition without additives, and will in general not exceed 3% based on that total, and in the preferred case will not exceed 1%. An example of a preferred additive combination comprises 0.36% by weight of alumina and 2.64% by weight of aluminium hydroxide.

In cases in which alumina is not used as an additive (for example, in which there is used another additive designated (A) above), the total additive content incorporated with the powder coating composition will in general be higher than when alumina is used, and may typically be in the range of from 0.5 to 15% by weight, with the content of each individual additive being in the range of from 0.1 to 14.9% by weight.

In the preferred case of two additives, the relative proportions of those additives may be in the range of from 1:99 to 99:1, typically (except where one of the additives is alumina), from 40:60 to 60:40. In the case of the additives designated (A) and (B) above, the proportion of component (A) may be from 10 to 40% of the total additive, and the proportion of (B) may be from 60 to 90% of the total additive.

Although the particle size of each dry-blended additive may be up to 5 microns, or even up to 10 microns in some cases, the particle size is preferably not greater than 2 microns, and is more especially not greater than 1 micron. In general, the lower the thickness of the coating that is to be applied, the smaller the particle size of the additives.

The additives used in accordance with the invention are incorporated into the powder coating composition by dry blending into the composition after its manufacture in powder form. It is strongly preferred for the additives to be pre-mixed, preferably intimately and homogeneously, before being dry-blended with the composition, but alternatively each additive may be incorporated and dry-blended separately.

In principle, it is possible for the additive combination of the invention to comprise one additive bearing a coating of a second additive. Thus, for example, an oxide additive (for instance, alumina) may have a coating of another oxide or hydrated oxide or hydroxide (for instance, hydrated zirconia, hydrated silica, or aluminium hydroxide) deposited thereon. Such a coating may be formed by methods known per se, for example, by precipitation or by evaporation of solvent from solution. There may be a single coating, or more than one coating may be applied.

A powder coating composition according to the invention may comprise a single powder coating component (film-forming polymer, curing agent, where appropriate, and optionally one or more colouring agents) or may comprise a mixture of two or more such components.

The or each powder coating component of a composition of the invention will in general be a thermosetting system, although thermoplastic systems (based, for example, on polyamides) can in principle be used instead.

The film-forming polymer used in the manufacture of the or each component of a thermosetting powder coating composition according to the invention may be one or more selected from carboxy-functional polyester resins, hydroxy-functional polyester resins, epoxy resins, and functional acrylic resins.

A powder coating component of the composition can, for example, be based on a solid polymeric binder system comprising a carboxy-functional polyester film-forming resin used with a polyepoxide curing agent. Such carboxy-functional polyester systems are currently the most widely used powder coatings materials. The polyester generally has an acid value in the range 10–100, a number average molecular weight Mn of 1,500 to 10,000 and a glass transition temperature Tg of from 30° C. to 85° C., preferably at least 40° C. The poly-epoxide can, for example, be a low molecular weight epoxy compound such as triglycidyl isocyanurate (TGIC), a compound such as diglycidyl terephthalate or diglycidyl isophthalate, an epoxy resin such as a condensed glycidyl ether of bisphenol A or a light-stable epoxy resin. Such a carboxyfunctional polyester film-forming resin can alternatively be used with a bis(beta-hydroxyalkylamide) curing agent such as tetrakis(2-hydroxyethyl) adipamide.

Alternatively, a hydroxy-functional polyester can be used with a blocked isocyanate-functional curing agent or an amine-formaldehyde condensate such as, for example, a melamine resin, a urea-formaldehyde resin, or a glycol ural formaldehyde resin, for example, the material "Powderlink 1174" supplied by the Cyanamid Company, or hexahydroxymethyl melamine. A blocked isocyanate curing agent for a hydroxy-functional polyester may, for example, be internally blocked, such as the uret dione type, or may be of the caprolactam-blocked type, for example, isopherone diisocyanate.

As a further possibility, an epoxy resin can be used with an amine-functional curing agent such as, for example, dicyandiamide- Instead of an amine-functional curing agent for an epoxy resin, a phenolic material may be used, preferably a material formed by reaction of epichlorohydrin with an excess of bisphenol A (that is to say, a poly phenol made by adducting bisphenol A and an epoxy resin). A functional acrylic resin, for example a carboxy-, hydroxy- or epoxyfunctional resin can be used with an appropriate curing agent. Mixtures of binders can be used, for example a carboxy-functional polyester can be used with a carboxy functional acrylic resin and a curing agent such as a bis (beta-hydroxyalkylamide) which serves to cure both polymers. As further possibilities, for mixed binder systems, a carboxy-, hydroxy- or epoxy-functional acrylic resin may be used with an epoxy resin or a polyester resin (carboxy- or hydroxy-functional). Such resin combinations may be selected so as to be co-curing, for example, a carboxy-functional acrylic resin co-cured with an epoxy resin, or a carboxy-functional polyester co-cured with a glycidyl-functional acrylic resin. More usually, however, such mixed binder systems are formulated so as to be cured with a single curing agent (for example, use of a blocked isocyanate to cure a hydroxy-functional acrylic resin and a hydroxy-functional polyester). Another preferred formulation involves the use of a different curing agent for each binder of a mixture of two polymeric binders (for example, an amine-cured epoxy resin used in conjunction with a blocked isocyanate-cured hydroxy functional acrylic resin).

Other film-forming polymers which may be mentioned include functional fluoropolymers, functional fluorochloropolymers and functional fluoroacrylic polymers, each of which may be hydroxy-functional or carboxy-functional, and may be used as the sole film-forming polymer or in conjunction with one or more functional acrylic, polyester and/or epoxy resins, with appropriate curing agents for the functional polymers.

Other curing agents which may be mentioned include epoxy phenol novolacs and epoxy cresol novolacs; isocyanate curing agents blocked with oximes, such as isopherone diisocyanate blocked with methyl ethyl ketoxime, tetramethylene xylene diisocyanate blocked with acetone oxime, and Desmodur W (dicyclohexylmethane diisocyanate curing agent) blocked with methyl ethyl ketoxime; light-stable epoxy resins such as "Santolink LSE 120" supplied by Monsanto; and alicyclic poly-epoxides such as "EHPE-3150" supplied by Daicel.

A powder coating component of a composition of the invention may be free from added colouring agents, but usually contains one or more such agents (pigments or dyes) and can contain one or more performance additives such as a flow-promoting agent, a plasticiser, a stabiliser, for example a stabiliser against UV degradation, an anti-gassing agent, such as benzoin, a filler, or two or more such additives may be present in the coating composition. Examples of pigments which can be used are inorganic pigments such as titanium dioxide, red and yellow iron oxides, chrome pigments and carbon black and organic pigments such as, for example, phthalocyanine, azo, anthraquinone, thioindigo, isodibenzanthrone, triphendioxane and quinacridone pigments, vat dye pigments and lakes of acid, basic and mordant dyestuffs. Dyes can be used instead of or as well as pigments.

A pigment content of<40% by weight of the total composition (disregarding dry blend additives of the invention) may be used. Usually a pigment content of 25–30% is used, although in the case of dark colours opacity can be obtained with<10% by weight of pigment. Where appropriate, a filler may be used to assist opacity, whilst minimising costs.

Conveniently, although materials which are coloured may be used as dry-blended additives for compositions according to the invention, it is not in general desired for the additives to change the colour of the composition, that colour normally being determined by the colouring agent(s) that may be incorporated before the composition is converted into powder form.

The invention also provides a process for forming a coating on a substrate, which comprises applying a composition according to the invention to a substrate by an electrostatic spray coating process, and heating the applied composition to melt and fuse the particles and cure the coating.

The electrostatic spray coating process may be a corona charging or tribo charging process. In the case of a tribo charging process, it is recommended that the powder coating composition should be one that has been formulated especially for such application, for example, by the use of suitable polymers of which the so-called "tribo-safe" grades are an example or by the use of additives which can be introduced prior to extrusion in a manner known per se.

The invention further provides a substrate coated by the process, the thickness of the applied coating preferably being 30 microns or less.

The substrate may comprise a metal, a heat-stable plastics material, wood, glass, or a ceramic or textile material. Advantageously, a metal substrate is chemically or mechanically cleaned prior to application of the composition, and is preferably subjected to chemical pretreatment, for example, with iron phosphate, zinc phosphate or chromate. Substrates other than metallic are in general preheated prior to application or are pretreated with a material that will aid electrostatic spray application.

EXAMPLES

The following Examples, which are given for illustration and not for limitation, illustrate the use of the dry-blended additives in accordance with the present invention.

In assessing the appearance of films formed from powder coating compositions, and especially the so-called "orange peel" effect, it is useful to consider graphical representations of data generated by profilometer examination of cured applied films. In the present Examples, such examination was carried out using a laser profilometer of the type UB16 manufactured by Ulrich Breitmeier Messtechnik GMBH (UBM). Light from a semi-conductor laser in the sensor is directed onto the panel surface as a focused spot. A movable lens suspended in the sensor is continuously adjusted to ensure that the focal point of the beam is always coincident with the film surface. The sensor is designed such that any roughness in the surface of the coating causes a displacement of the focusing lens which in turn is detected by a second measuring system.

The resulting data is shown graphically in the accompanying FIGS. 1 to 7, in which.

Figure 8:
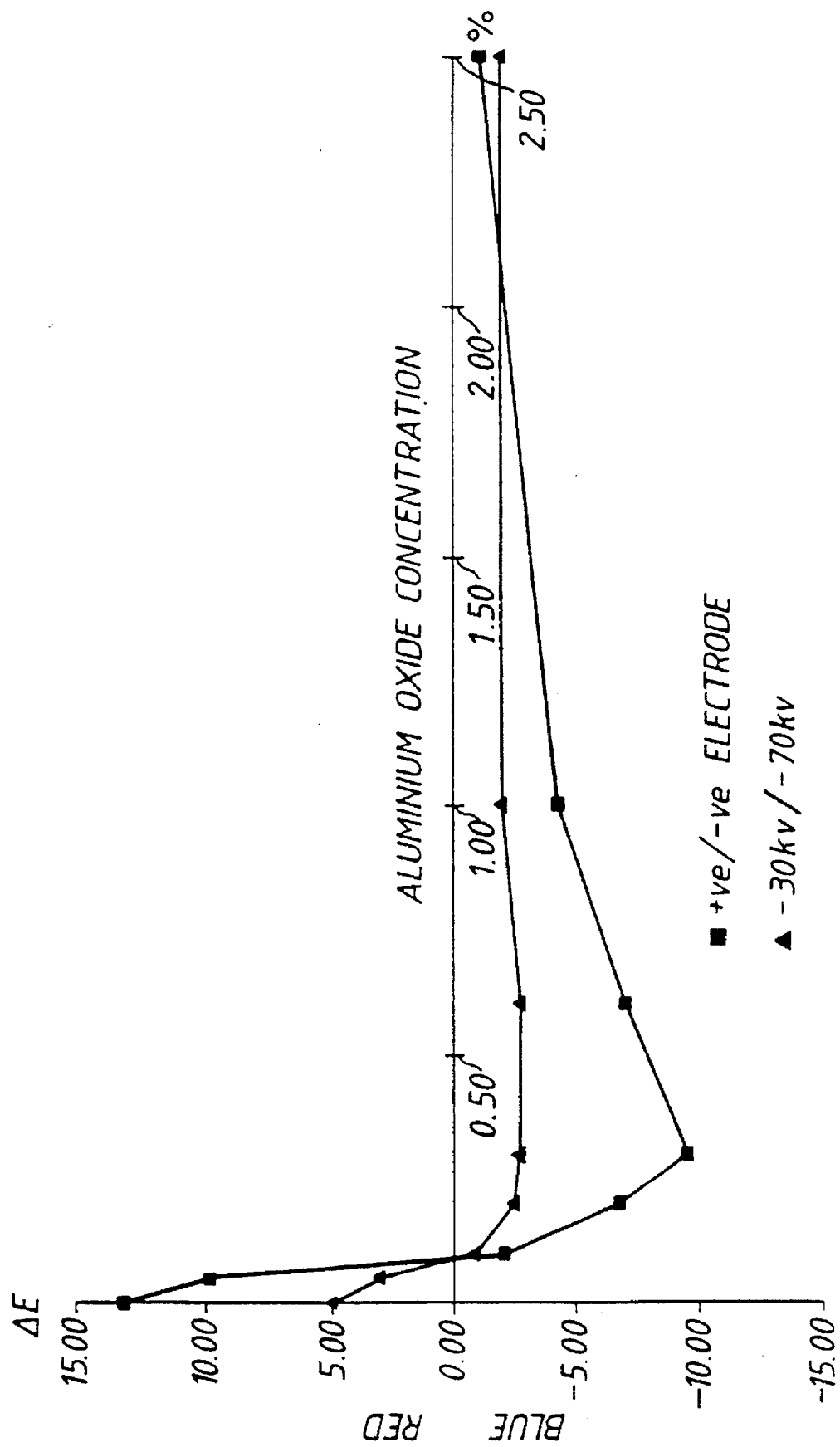
Figure 9:
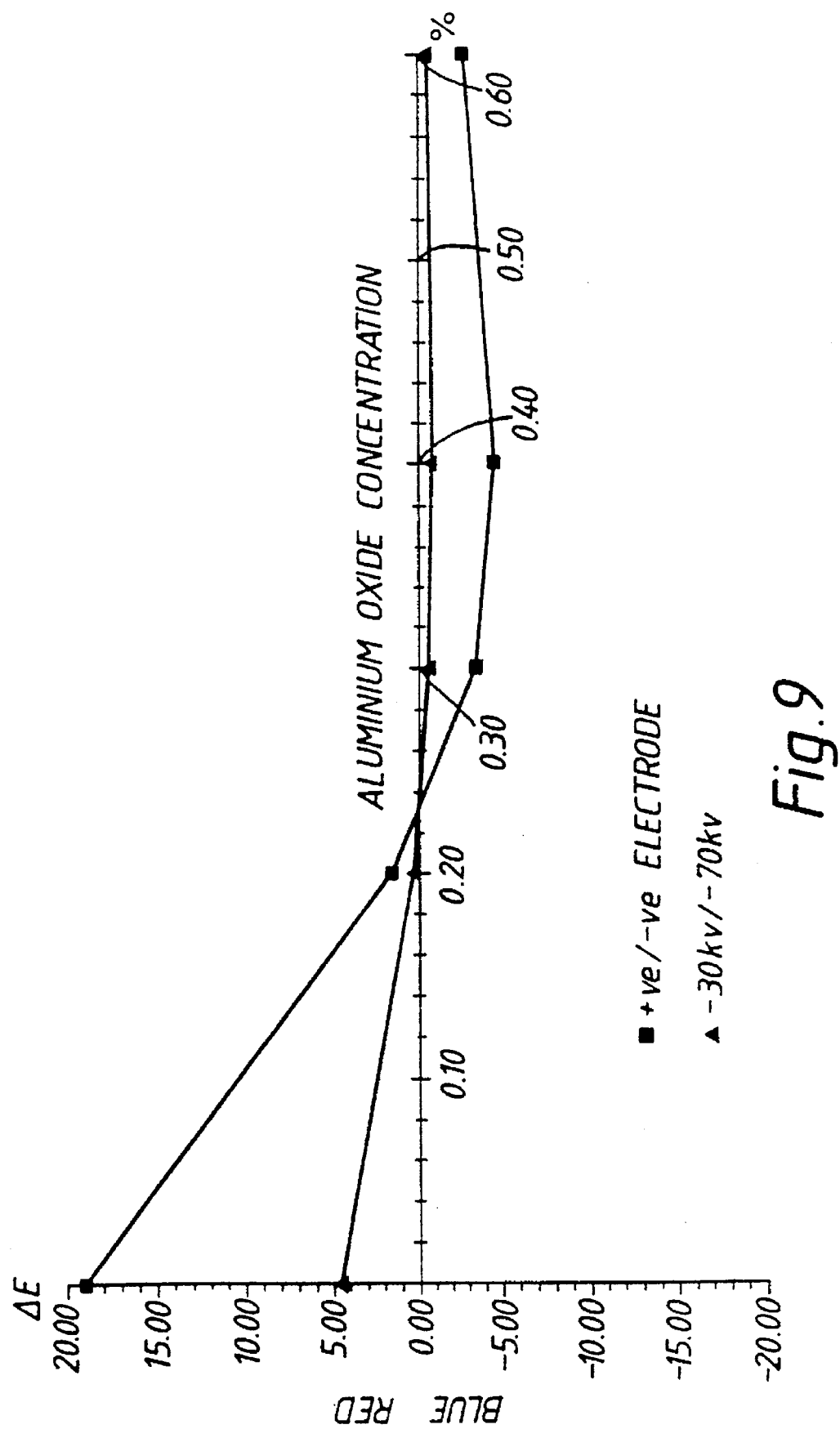
Figure 10:
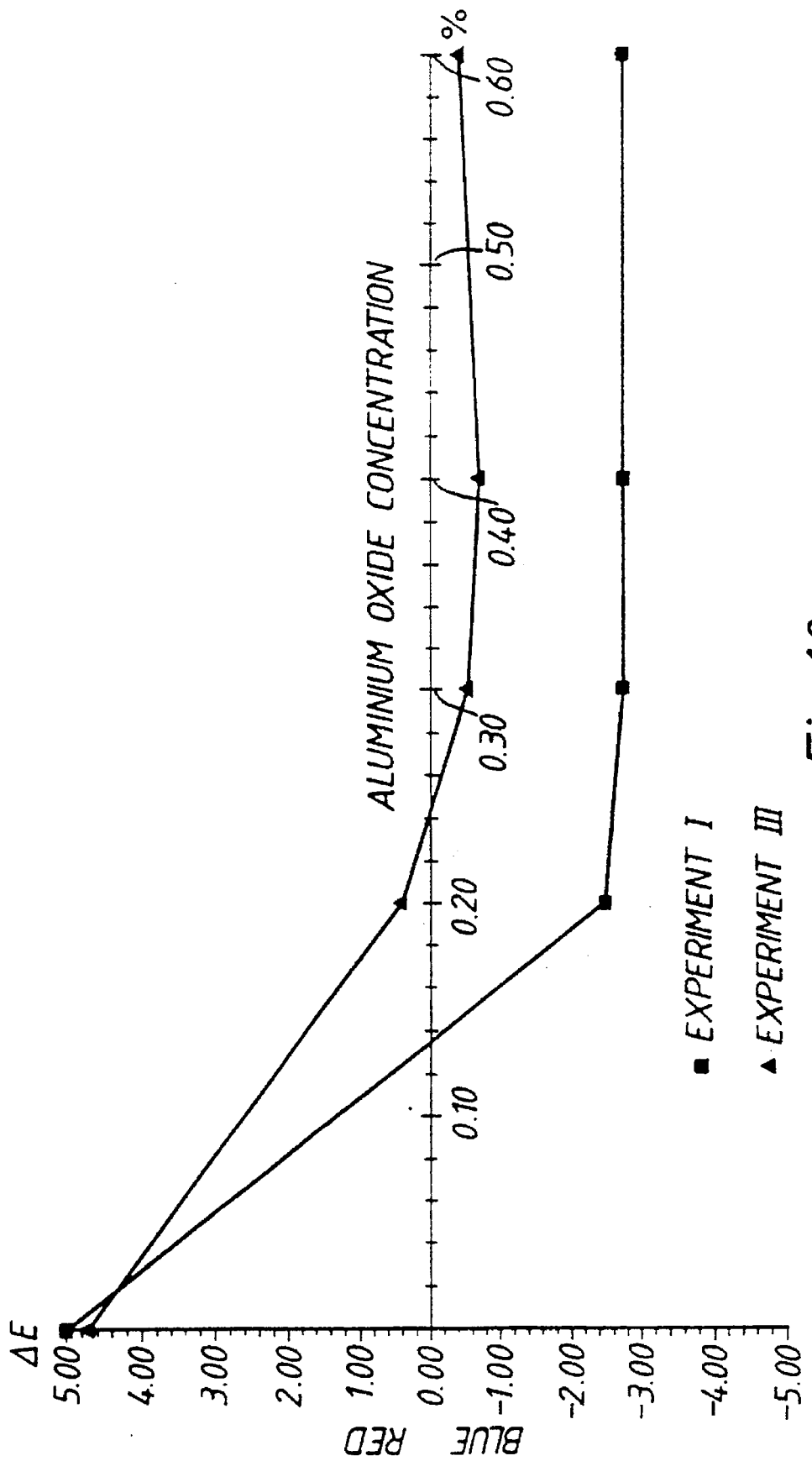

FIGS. 8, 9 and 10 of the accompanying drawings are graphical representations of data reported in Experiments I and III hereinafter.

Referring to FIGS. 1 to 7, the graphical representation reflects the "orange peel" of the surface. The greater the amplitude and the shorter the wavelength of the series of peaks the more pronounced the orange peel.

Figure 1:
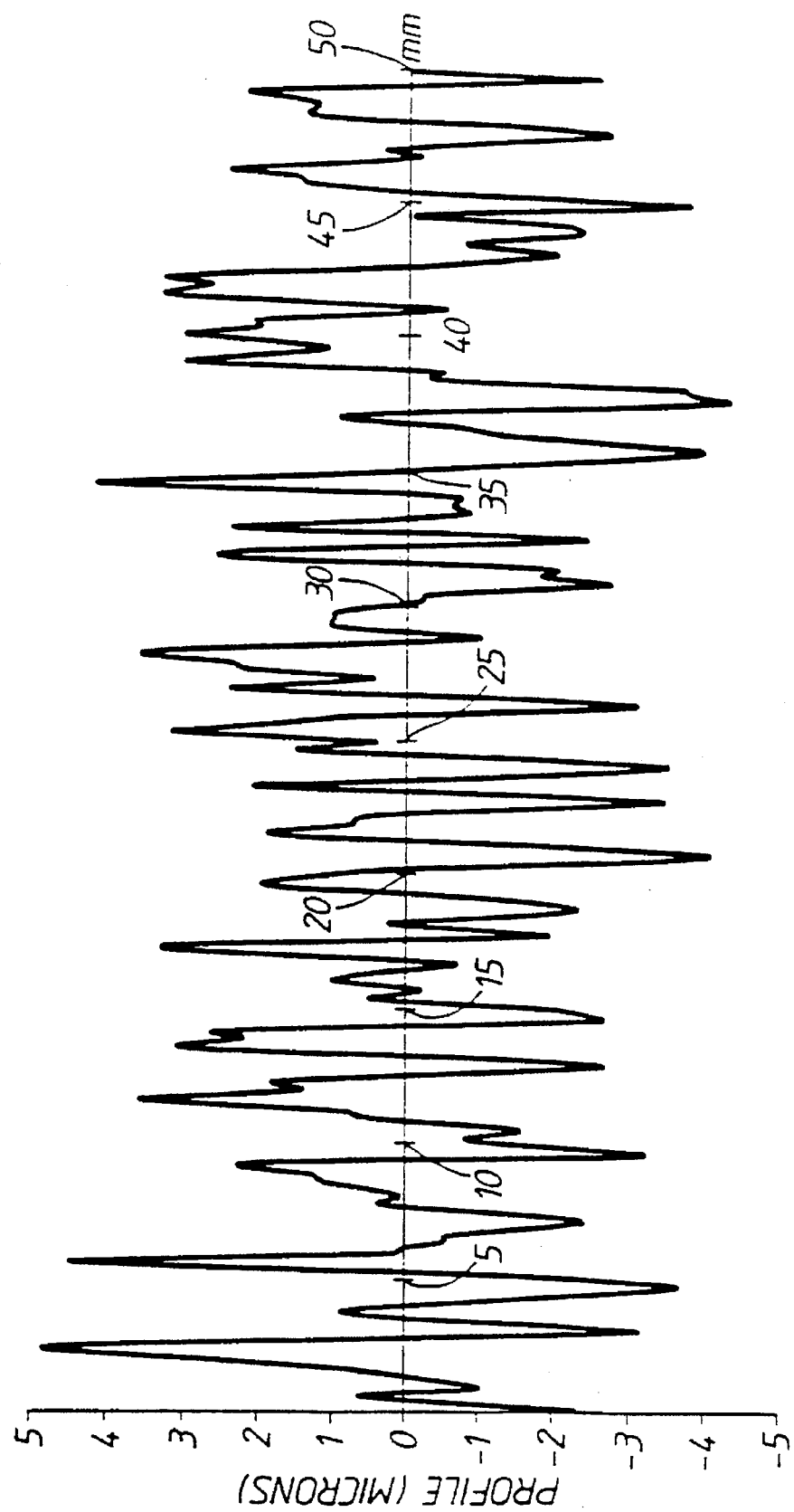
FIG. 1 shows, for comparison purposes, the results of profilometer analysis of a 50 micron film formed from a powder coating composition of standard particle size.

The film represented in FIG. 1 has a very poor aesthetic appearance.

Figure 6:
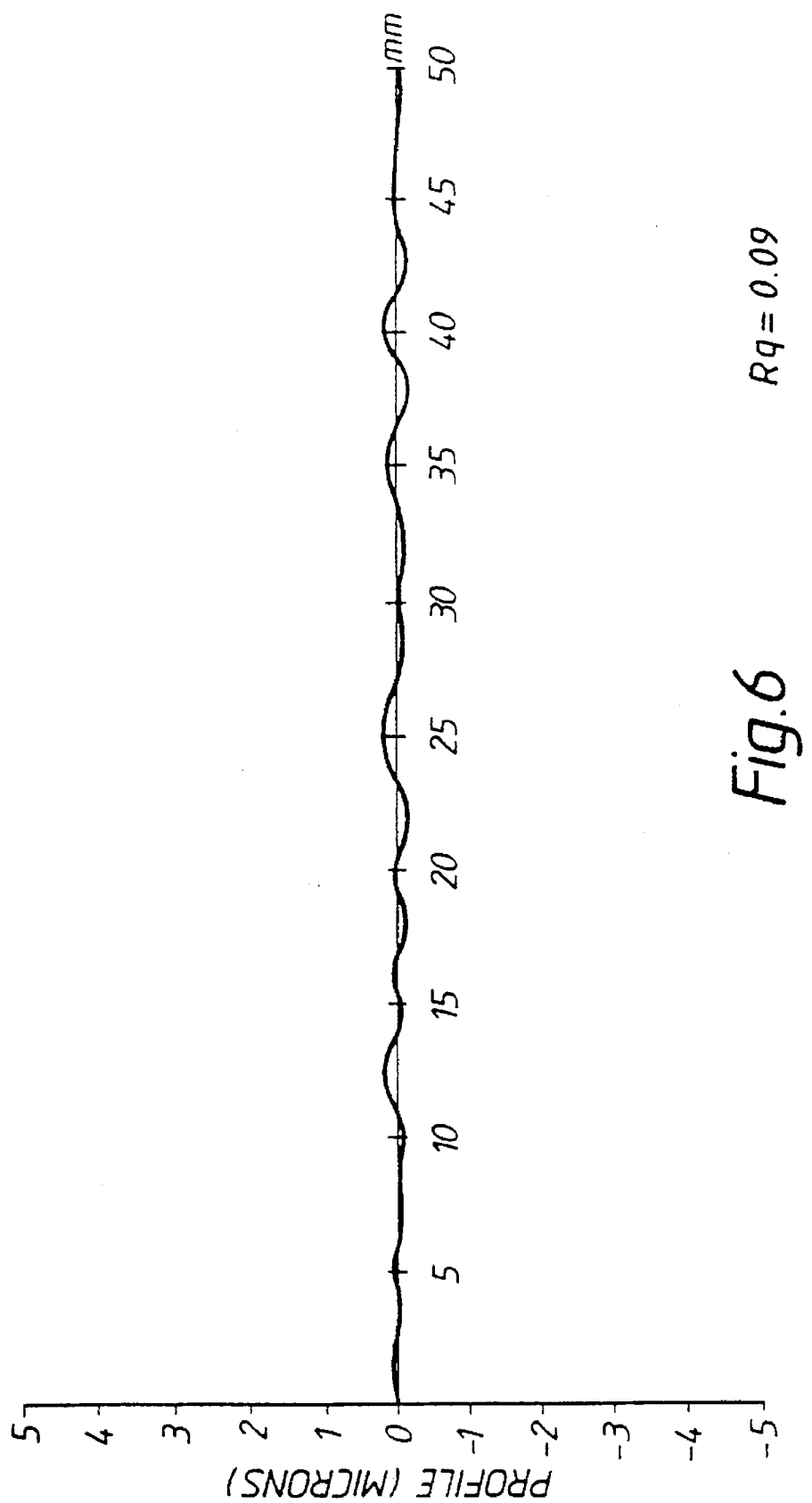
FIG. 6 shows the profilometer results of a cured film of 20 microns formed, in accordance with the invention, from the "standard" powder of Example (2) after size reduction and incorporation of an additive mixture according to the invention.
Figure 7:
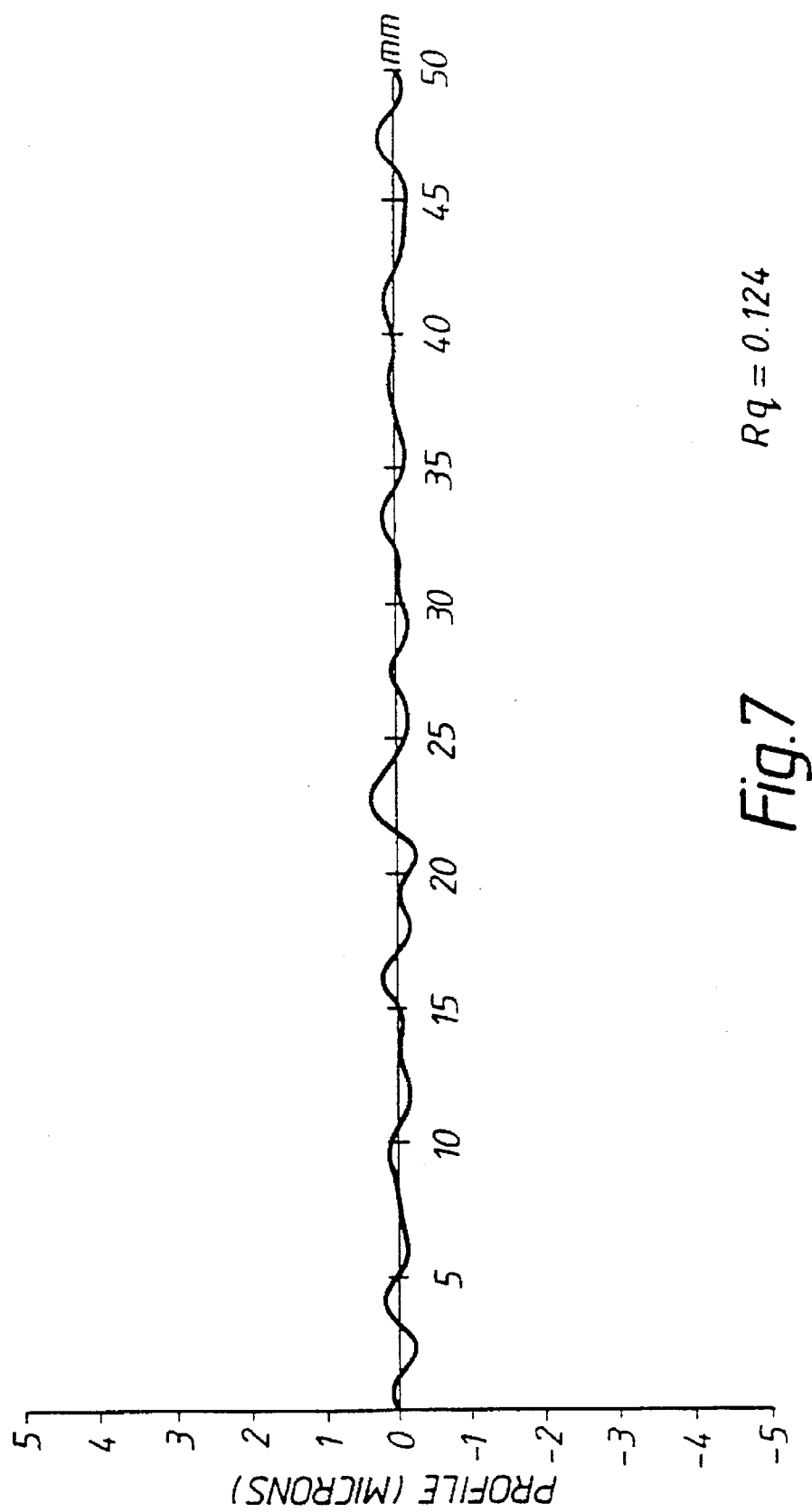
FIG. 7 shows the profilometer results of a cured film of 35 microns formed from the powder composition according to the invention described in Example (6)

In marked contrast, it can be seen for instance that FIG. 6, which shows an example of excellent flow and levelling, has almost no deviation from the centre line, reflecting the almost total absence of orange peel. The data for the amplitude of the orange peel can be converted to a root mean square roughness parameter which is expressed in microns, and is the so-called Rq value (referred to herein as the roughness quotient). The worst flow (FIG. 1) has a roughness quotient of 1.89 µm and the best flow (FIG. 6) 0.086 µm. From this it can be seen that the lower the roughness quotient the better the flow. In each Figure, the vertical axis shows the surface profile in microns. The scale of the horizontal axis is in millimetres.

The aluminium oxide used in the Examples was Aluminium Oxide C ex Degussa, mean particle size<0.2 microns; the aluminium hydroxide used was "Martinal OL107" ex Croxton & Garry, mean particle size 0.9–1.3 microns; and the aluminium silicate used was Aluminium silicate P820 ex Degussa, mean primary particle size<0.1 microns.

| Dry-Blend Additive Composition 1 | |
|---|---|
| Aluminium oxide | 120 g |
| Aluminium hydroxide | 880 g |

The dry blend additives were charged to a Moulinex high-shear blender, mixed for 60 seconds, and reserved for future use.

| Dry Blend Additive Composition 2 | |
|---|---|
| Aluminium oxide | 350 g |
| Aluminium hydroxide | 650 g |

The dry blend additives were charged to a Moulinex high-shear blender, mixed for 60 seconds, and reserved for future use.

| Dry Blend Additive Composition 3 | |
|---|---|
| Aluminium oxide | 500 g |
| Aluminium silicate | 500 g |

The dry blend additives were charged to a Moulinex high-shear blender, mixed for 60 seconds, and reserved for future use.

Example (1)

| White Hybrid Powder Coating Composition | |
|---|---|
| Rutile Titanium Dioxide white pigment | 250 g |
| Black iron oxide 306 | 1 g |
| Ultramarine Blue No. 17 | 1 g |
| Filler (barytes) | 150 g |
| Carboxylic Acid-Functional Polyester Resin | 372 g |
| Epoxy Resin Curing Agent | 164 g |
| Aldehyde Resin Laropal A81 | 50 g |
| Catalyst | 1 g |
| Flow Modifier | 5 g |
| Benzoin | 3 g |
| Polyethylene Wax | 3 g |

The ingredients were dry mixed in a blender, and fed into a twin-screw extruder operating at a temperature of 108° C. The extrudate was ground in an impact mill to produce a powder with the following particle size distribution:

100%<103 microns
30%<20 microns
10%<10 microns
3%<5 microns
$D(v)_{50}$ 30.9 microns The fluidity index of the above 'standard' powder was measured using a SAMES AS 100 Flowmeter and was found to be 39.3.

A part of the White Hybrid Powder Coating Composition was then electrostatically spray applied to steel panels to give cured films of 55 microns and 30 microns respectively, (Stoving conditions of 15 minutes at 180° C. were used to cure both panels). Both panels had 88% gloss 60° head. The flow and levelling of the films were assessed using a laser profilometer. This gave roughness quotients of 0.55 μm for the 55 micron film, and 0.83 μm for the 30 micron film. This is also shown graphically in FIGS. 2 and 3, respectively.

Each of these coatings formed from "standard" powder (which had a gel time of 80 seconds at 200° C.) had a Gardener impact resistance of 10 Joules (Forward and Reverse impact), and a 5.0 mm Erichsen indentation.

Figure 4:
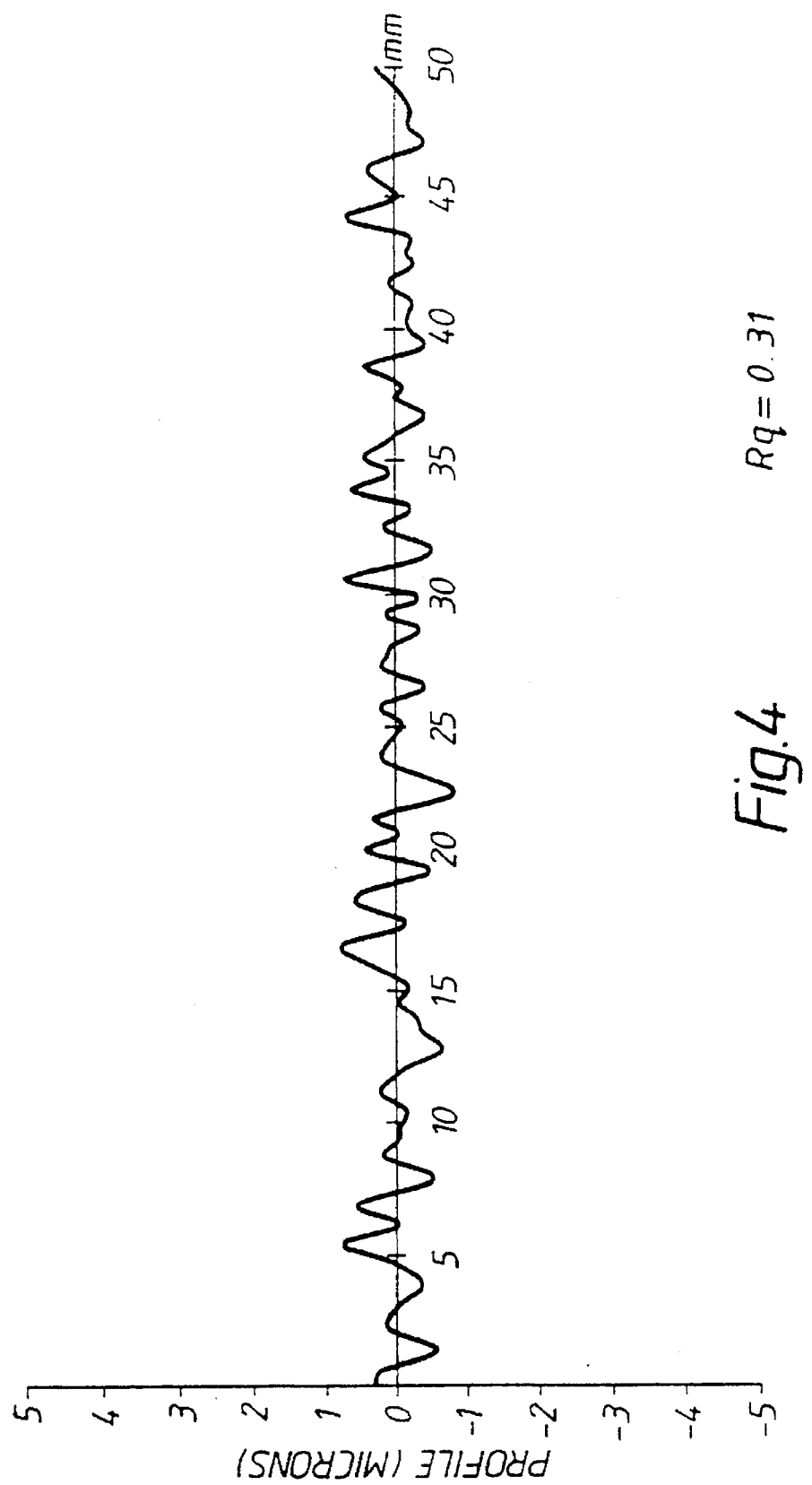
FIG. 4 shows the profilometer results of a cured film of 30 microns formed, in accordance with the invention, from the "standard" powder of Example (1) after size reduction and incorporation of an additive mixture according to the invention.

Another part of the White Hybrid Powder Coating Composition was then further size reduced using an Alpine jet mill (400AFG). The classifier speed on the jet mill was adjusted until the particle size was such that the maximum particle size produced was nominally 35 microns. The particle size distribution of the resulting powder was as follows:

99%<50 microns
72%<20 microns
35%<10 microns
10%<5 microns
$D(v)_{50}$ 13.9 microns The size-reduced powder coating composition was then blended with a 0.8% by weight addition of Dry Blend Additive Composition 2. The total composition incorporating the Additive was spray applied to a steel panel to give a 30 micron film. The flow and levelling of this film were determined, and its roughness quotient was found to be 0.31 μm (FIG. 4).

The same composition was subsequently spray applied to aluminium substrate under the same conditions as above to give an 80–85 micron film with no apparent defects as a result of the high film build. The flow and levelling of this film were determined with its Rq value found to be 0.17 μ.

The gel time of the powder and the physical and mechanical properties of the film were the same as the standard powder coating above.

In another experiment a sample of the raw size-reduced powder was blended via a low-shear technique with 0.75% of Dry Blend Additive Composition 3. The total composition incorporating the additive was then spray applied to a steel panel to give a 30 micron film. The Rq value of the subsequently cured film was found to be 0.32 μm. This is a similar result in terms of aesthetic appearance to that achieved when using Dry Blend Additive Composition 2.

In a further experiment the White Hybrid Powder Coating formulation was manufactured as described above, with the exception that on this occasion the impact mill was equipped with a twin cyclone collection device. With this arrangement the finer particle size powder that normally might be expected to escape from the primary cyclone is collected in the secondary cyclone. Accordingly the impact mill (a Hosokawa ACM30) was set to produce the smallest particle size (classifier speed 2700 rpm and an air flow of 26 m³/min.). The fine powder particles were collected in the secondary cyclone, and had the following particle size distribution:

100%<35 microns
97%<20 microns
75%<10 microns
32%<5 microns
$D(v)_{50}$ 6.7 microns The fluidity index of the resulting fine powder (not incorporating the additives of the invention) was measured using an AS 100 Flowmeter and was found to be only 2.1, as compared with 39.3 for the powder of 'standard' size.

This fine powder was blended with a 1.0% by weight addition of Dry Blend Additive Composition 2. The fluidity index of the resulting powder coating composition according to the invention (measured using a SAMES AS 100 Flowmeter) was 109, as compared with only 2.1 for the size-reduced powder not incorporating the additives of the invention. The total composition incorporating the Additive was then spray applied to a steel panel to give a 30 micron film. The flow and levelling of this film were determined, and its roughness quotient was found to be 0.17 μm.

Again the gel time of the powder and the mechanical properties of the film remained as for the standard powder coating.

Example (2)

| Thin Film Primer Composition | |
|---|---|
| Rutile Titanium Dioxide White Pigment | 190 g |
| Bayferrox | 3 g |
| Helicosin Blue Pigment | 5 g |
| Carbon Black | 2 g |
| Filler (dolomite) | 60 g |
| Filler (barytes) | 80 g |
| Bisphenol-A Epoxy Resin | 533 g |
| Styrene/Maleic anhydride Resin SMA1440 | 90 g |
| Amine Curing Agent | 28 g |
| Flow Modifier | 6 g |
| Benzoin | 2 g |

The ingredients were dry mixed, and fed to an extruder blender operating at a temperature of 90° C. The extrudate was ground in an impact mill to produce a "standard" powder with a particle size distribution as follows:

100%<98 microns
33%<20 microns
11%<10 microns

3%<5 microns

D(v)$_{50}$ 28 microns

Figure 5:
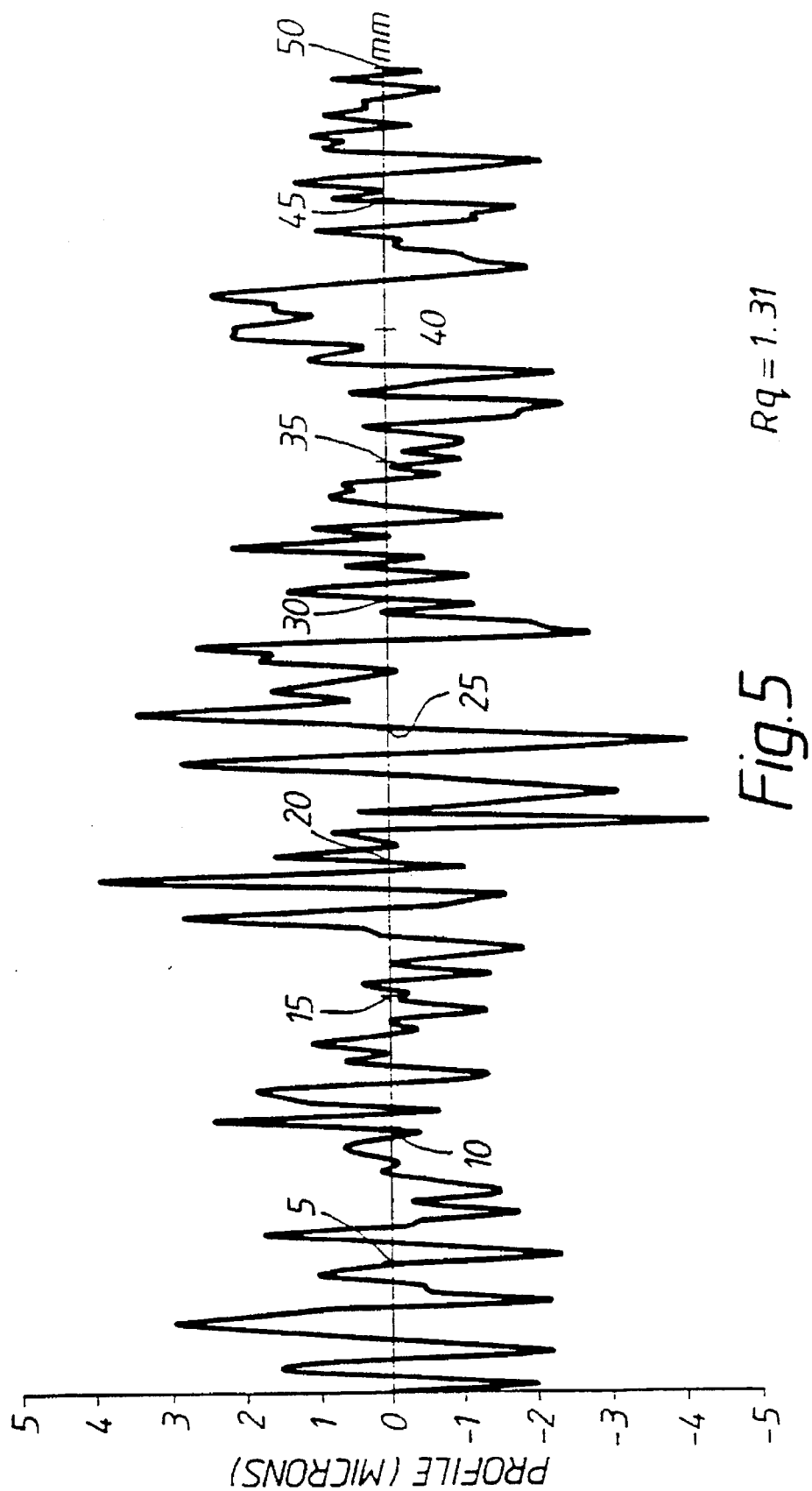
FIG. 5 shows the profilometer results of a cured film of 20 microns formed from the comparison "standard" powder described in Example (2)

This primer powder composition was electrostatically spray applied to an aluminium panel to give a film with a thickness of 20 microns. (Cure at 140° C. for 15 minutes). The flow and levelling of the film were examined by laser profilometry, and its roughness quotient determined to be 1.31 μm (FIG. 5).

The primer powder was then further size reduced using an air impact jet mill. The particle size distribution of the resulting powder was:

99%<10 microns

47%<5 microns

D(v)$_{50}$ 5.1 microns

The fine powder was then blended with 1.1% of Dry Blend Additive Composition 1, and spray applied to an aluminium panel to give a film with a thickness of 20 microns (cure at 140° C.). The film was examined by laser profilometry, and its roughness quotient determined to be 0.09 μm (FIG. 6).

The coated panels obtained in Example (2) were then compared in a series of performance tests.

| TEST PERFORMED | RESULTS OF TEST | |
| --- | --- | --- |
| | STANDARD POWDER | SIZE-REDUCED POWDER |
| Impact Resistance (50 in.lb. for 30 in.lb rev) | Pass | Pass |
| Dry and Wet Tape Adhesion | Pass | Pass |
| Salt Spray Resistance (1000 Hours) | Pass | Pass |
| Filiform Corrosion Resistance (1000 Hrs) | Pass (1.5 mm creep) | Pass (1.5 mm creep) |

Colour Mixing Examples

The base colour powder coating compositions were prepared as individual compositions according to the following formulations.

| POLYESTER/EPOXY HYBRID | |
| --- | --- |
| White Hybrid Powder Base | |
| Rutile Titanium Dioxide white pigment | 313 g |
| Filler (Dolomite) | 7 g |
| Carboxylic Acid-Functional Polyester Resin | 473 g |
| Epoxy Resin Curing Agent | 190 g |
| Catalyst | 2 g |
| Flow Modifier | 7 g |
| Benzoin | 3 g |
| Polyethylene Wax | 5 g |

The ingredients were dry mixed in a blender, and fed into a twin-screw extruder operating at a temperature of 108° C. The extrudate was ground in an impact mill to produce a powder with a particle size of 100%<180 microns.

This powder was then further size reduced in an air jet mill (Alpine 400 AFG) to produce a powder with the following particle size distribution:

100%<12 microns

95%<10 microns

55%<5 microns

D(v)$_{50}$ 3.6 microns

| Blue Hybrid Powder Base | |
| --- | --- |
| CI Pigment Blue 60 | 49 g |
| Filler (barytes) | 30 g |
| Filler (dolomite) | 30 g |
| Carboxylic Acid-Functional Polyester Resin | 642 g |
| Epoxy Resin Curing Agent | 234 g |
| Catalyst | 2 g |
| Flow Modifier | 7 g |
| Benzoin | 3 g |
| Polyethylene Wax | 3 g |

The ingredients were dry mixed in a blender, and fed into a twin-screw extruder operating at a temperature of 108° C. The extrudate was ground in an impact mill to produce a powder with a particle size of 100%<180 microns.

This powder was then further size reduced in an air jet mill (Alpine 400 AFG) to produce a powder with the following particle size distribution:

100%<12 microns

93%<10 microns

54%<5 microns

D(v)$_{50}$ 3.9 microns

| Red Hybrid Powder Base | |
| --- | --- |
| CI 170 Novoperm Red Pigment | 78 g |
| Filler (barytes) | 52 g |
| Filler (dolomite) | 52 g |
| Carboxylic Acid-Functional Polyester Resin | 564 g |
| Epoxy Resin Curing Agent | 237 g |
| Catalyst | 2 g |
| Flow Modifier | 8 g |
| Benzoin | 3 g |
| Polyethylene Wax | 4 g |

The ingredients were dry mixed in a blender, and fed into a twin-screw extruder operating at a temperature of 103° C. The extrudate was ground in an impact mill to produce a powder with a particle size of 100%<180 microns.

This powder was then further size reduced in an air jet mill (Alpine 400 AFG) to produce a powder with the following particle size distribution:

100%<8 microns

60%<5 microns

D(v)$_{50}$ 3.1 microns

Example (3)

| Light Blue Powder Coating Composition A (Comparison) | |
| --- | --- |
| White Hybrid Powder Base | 500 g |
| Blue Hybrid Powder Base | 500 g |

The powder bases were charged to a Moulinex high-shear blender, and mixed for 10 seconds to give a mixture having a fluidity index [SAMES AS 100 Flowmeter] of 0.The powder mixture was then sprayed at −30 kV and −70 kV application voltage (Ransberg Gema PG1 gun) onto two separate aluminium panels. Powder spraying was particularly difficult due to the fine particle size of the powder coating compositions, which gave rise to substantial blocking and surging of powder in the spray gun.

The coated panels were stoved at 200° C. for 15 minutes. The two panels were then analysed for colour difference using a Macbeth MS 2020 spectrophotometer and an ICS colour our computer.

The colour difference between the two panels was found to be Δ E (D65 light)=6.7.

| Light Blue Powder Coating Composition B (According to the invention) | |
|---|---|
| White Hybrid Powder Base | 500 g |
| Blue Hybrid Powder Base | 500 g |
| Dry Blend Additive Composition 1 | 10 g |

The powder bases and dry blend additive according to the present invention were charged to a Moulinex high-shear blender, and mixed for 10 seconds. The resulting powder mixture (which had a fluidity index of 51 according to the SAMES AS 100 Flowmeter) was then sprayed at −30 kV and −70 kV application voltage (Ransberg Gema PG1 gun) onto two separate aluminium panels. On this occasion the powder sprayed freely.

The coated panels were stoved at 200° C. for 15 minutes. The two panels were then analysed for colour difference using a Macbeth MS 2020 spectrophotometer and an ICS colour computer.

The colour difference between the two panels was found to be Δ E (D65 light)=0.3.

Example (4)

| Purple Powder Composition A (Comparison) | |
|---|---|
| White Hybrid Powder Base | 400 g |
| Blue Hybrid Powder Base | 200 g |
| Red Hybrid Powder Base | 400 g |

The powder bases were charged to a Kenwood chef blender (low shear) and mixed for 15 minutes. The powder mixture was then sprayed at −30 kV and −70 kV application voltage (Ransberg Gema 701-6 gun) onto two separate steel panels. Powder spraying was particularly difficult due to the fine particle size of the powder coating compositions, which gave rise to substantial blocking and surging of powder in the spray gun.

The coated panels were stoved at 200° C. for 15 minutes to give cured films with a film thickness of 30 microns. The two panels were then analysed for colour difference using a Macbeth MS 2020 spectrophotometer and an ICS colour computer.

The colour difference between the two panels was found to be Δ E (D65 light)=3.35.

| Purple Powder Composition B (According to the invention) | |
|---|---|
| White Hybrid Powder Base | 400 g |
| Blue Hybrid Powder Base | 200 g |
| Red Hybrid Powder Base | 400 g |
| Dry Blend Additive Composition 2 | 10 g |

The powder bases and dry blend additive according to the present invention were charged to a Kenwood chef blender, and mixed for 15 minutes. The resulting powder mixture was then sprayed at −30 kV and −70 kV application voltage (Ransberg Gema 701-6 gun) onto two separate steel panels. On this occasion the powder sprayed freely.

The coated panels were stoved at 200° C. for 15 minutes to give cured films with a film thickness of 30 microns. The two panels were then analysed for colour difference using a Macbeth MS 2020 spectrophotometer and an ICS colour computer.

The colour difference between the two panels was found to be Δ E (D65 light)=0.5.

Example (5)

| Red Powder Composition (According to the invention) | |
|---|---|
| White Hybrid Powder Base | 666 g |
| Red Hybrid Powder Base | 334 g |
| Dry Blend Additive Composition 2 | 10 g |

The powder bases and dry blend additive according to the present invention were charged to a Kenwood chef blender, and mixed for 15 minutes. The powder mixture was then sprayed at −70 kV application voltage (Ransberg Gema 701-6 gun) onto an aluminium panel. On this occasion the powder sprayed freely.

The coated panel was stoved at 200° C. for 15 minutes to give a cured film with a film thickness of 12–15 microns, and excellent flow and levelling. The surface profile of the film was measured using a laser profilometer (manufactured by UBM). This gave a roughness quotient of 0.182 μm.

| POLYESTER/HYDROXALKYL AMIDE | |
|---|---|
| Blue Powder Base | |
| 'Graphitol' Blue Pigment | 33 g |
| Filler (Barytes) | 87 g |
| Carboxylic Acid-Functional Polyester Resin | 826 g |
| Hydroxyalkyl Amide Curing Agent | 34 g |
| Flow Modifier | 14 g |
| Benzoin | 3 g |
| Carnauba Wax | 3 g |

The ingredients were dry mixed, and fed to an extruder blender operating at a temperature of 100° C. The extrudate was ground in an impact mill to produce a powder with a particle size of 100%<180 microns.

This powder was then further size reduced in an air jet mill to prepare a powder sample of which the particle size distribution by volume was as follows:

99.0%<10 microns
43.0%<5 microns
D(v)$_{50}$ 5.5 microns

| Earth Red Powder Base | |
|---|---|
| Red Iron Oxide Pigment 130 BM | 111 g |
| Filler (Barytes) | 190 g |
| Carboxylic Acid-Functional Polyester Resin | 656 g |
| Hydroxyalkyl Amide Curing Agent | 27 g |
| Flow Modifier | 10 g |
| Benzoin | 3 g |
| Carnauba Wax | 3 g |

The ingredients were dry mixed, and fed to an extruder blender operating at a temperature of 140° C. The extrudate was ground in an impact mill to produce a powder with a particle size of 100%<180 microns.

This powder was then further size reduced in an air jet mill to prepare a powder sample of which the particle size distribution by volume was as follows:

99%<10 microns

47%<5 microns

D(v)₅₀ 5.1 microns

| White Powder Base | |
| --- | --- |
| Rutile Titanium Dioxide White Pigment | 335 g |
| Filler (Barytes) | 25 g |
| Carboxylic Acid-Functional Polyester Resin | 595 g |
| Hydroxyalkyl Amide Curing Agent | 25 g |
| Flow Modifier | 14 g |
| Benzoin | 3 g |
| Carnauba Wax | 3 g |

The ingredients were dry mixed, and fed to an extruder blender operating at a temperature of 140° C. The extrudate was ground in an impact mill to produce a powder with a particle size of 100%<180 microns.

This powder was then further size reduced in an air jet mill to prepare a powder sample of which the particle size distribution by volume was as follows:

100%<10 microns

44%<5 microns $D(v)_{50}$ 5.3 microns

The fluidity index of each of the Blue, Earth Red and White Powder Bases [fine powders, no additives according to the invention] was 0 as measured using the SAMES AS 100 Flowmeter.

Example (6)

| Cameo Blue Powder Composition (According to the invention) | |
| --- | --- |
| Blue Powder Base | 330 g |
| White Powder Base | 520 g |
| Earth Red Powder Base | 150 g |
| Dry Blend Additive Composition 2 | 10 g |

The powder bases were charged to a Kenwood Chef blender and mixed for 15 minutes. The Dry Blend Additive according to the present invention was then added and mixed in at low speed. The powder composition incorporating the Additive (which had a fluidity index of 84 according to the SAMES AS 100 Flowmeter) was then electrostatically sprayed onto an aluminium panel to give a film thickness of 35 microns. The coating was cured at 200° C. for 10 minutes. The resulting film was a homogeneous blue colour which showed high gloss (90% on a 60° head) with excellent flow. The roughness quotient for this film was 0.124 μm, and is shown graphically in FIG. 7.

Example (7)

| Cream Low Gloss Tribocharging Hybrid Powder Coating Composition Formulation | |
| --- | --- |
| Carboxylic acid functional Polyester Resin | 33.79% |
| Epoxy Resin Curing agent | 27.12% |
| Benzoin | 0.18% |
| Wax | 0.54% |
| Charge Control Agent | 0.36% |
| Catalyst | 0.02% |
| Rutile Titanium Dioxide Pigment | 27.12% |
| Black iron oxide | 0.03% |

| Cream Low Gloss Tribocharging Hybrid Powder Coating Composition Formulation | |
| --- | --- |
| Red iron oxide | 0.01% |
| Yellow iron oxide | 0.14% |
| Filler | 9.06% |
| Flow Modifier | 1.45% |

The ingredients were dry mixed in a blender and fed into a twin screw extruder at 108° C. The extrudate was ground in an impact mill and sieved to produce, for comparison purposes, a powder with a particle size distribution of 100%<106 μm.

A part of the resulting cream hybrid composition was then tribostatically spray applied to aluminium panels using a Nordson ICAB gun and stoved at 180° C. for 15 minutes. The cured films were of a film thickness 50–60 μ with a gloss level of 26–28% (at 60°).

Another part of the cream hybrid composition was then further size reduced using an Alpine jet mill (100AFG). The classifier speed on the jet mill was adjusted until the particle size was such that the maximum particle size produced was nominally 35 μm. The particle size distribution of the resulting powder was as follows:

100%<36 μ

87%<20 μ

40%<10 μ

$D_v(50)=12.1$ μ

The size-reduced powder coating composition was then blended using a low-shear technique with a 1.0% by weight addition of Dry Blend Additive Composition 2. The total composition incorporating the Additive according to the invention was then spray applied to an aluminium panel using the same Nordson ICAB tribo gun as before to give a 30 micron film.

The flow and levelling of the two films were determined using a laser profilometer. The Roughness quotient of such a system is seen to be a combination of two types of surface roughness—firstly from the general flow and levelling of a powder coating and secondly from the deliberate disruption of the surface designed to give a matt appearance. However, because the nature of the two types of surface roughening were very different, it was possible through the computer programme which controlled the profilometer to separate the effects. The results were as follows:

| Standard (Comparison) | | Thin Film powder (Invention) | |
| --- | --- | --- | --- |
| Orange Peel | Matt & Noise | Orange Peel | Matt & Noise |
| 1.41 | 0.36 | 0.29 | 0.34 |

Figure 2:
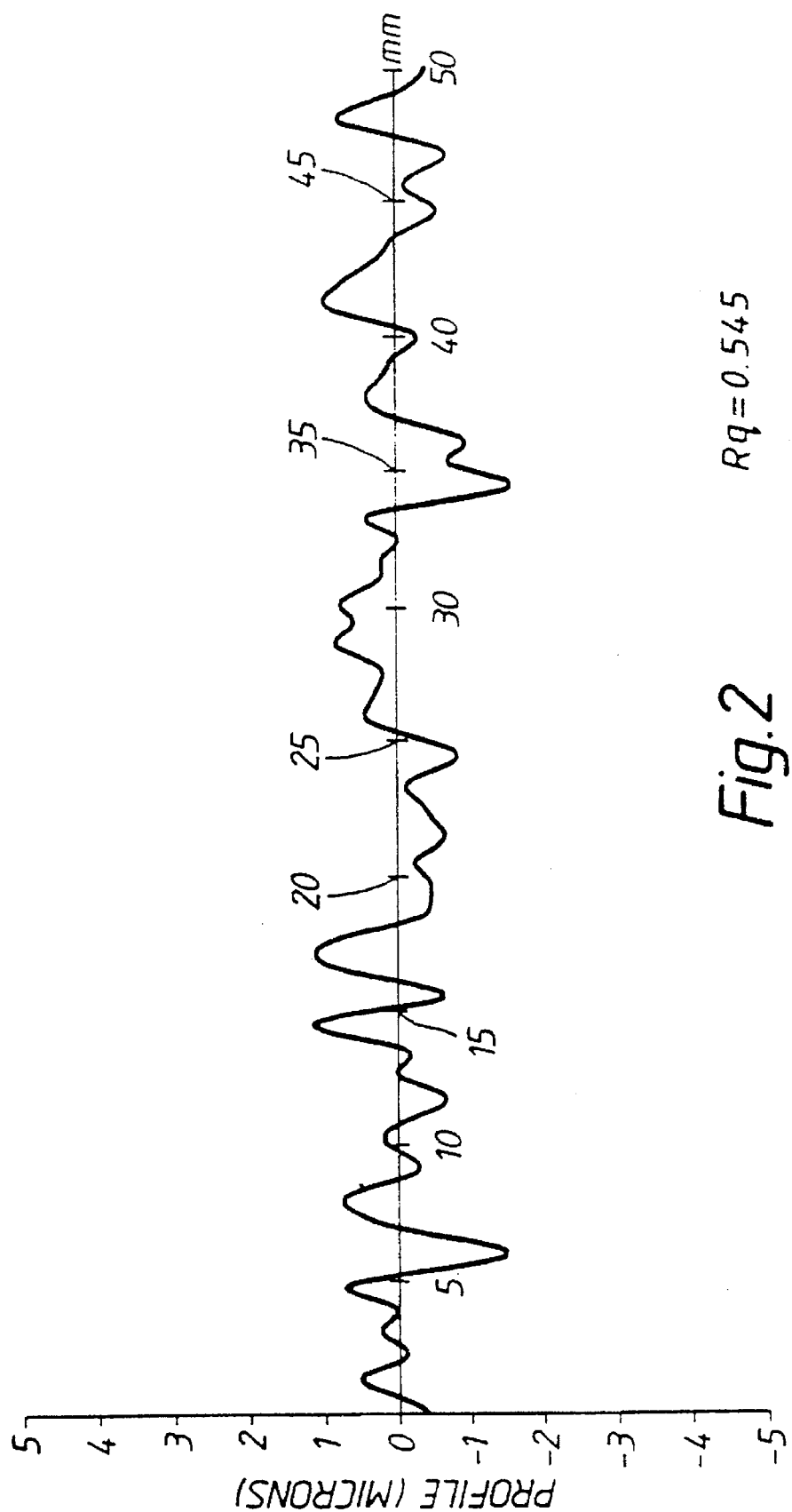
FIG. 2 shows the profilometer results of a cured film of 55 microns formed from the comparison "standard" powder described in Example (1)—a powder superior to that used in forming the film represented in FIG. 1.
Figure 3:
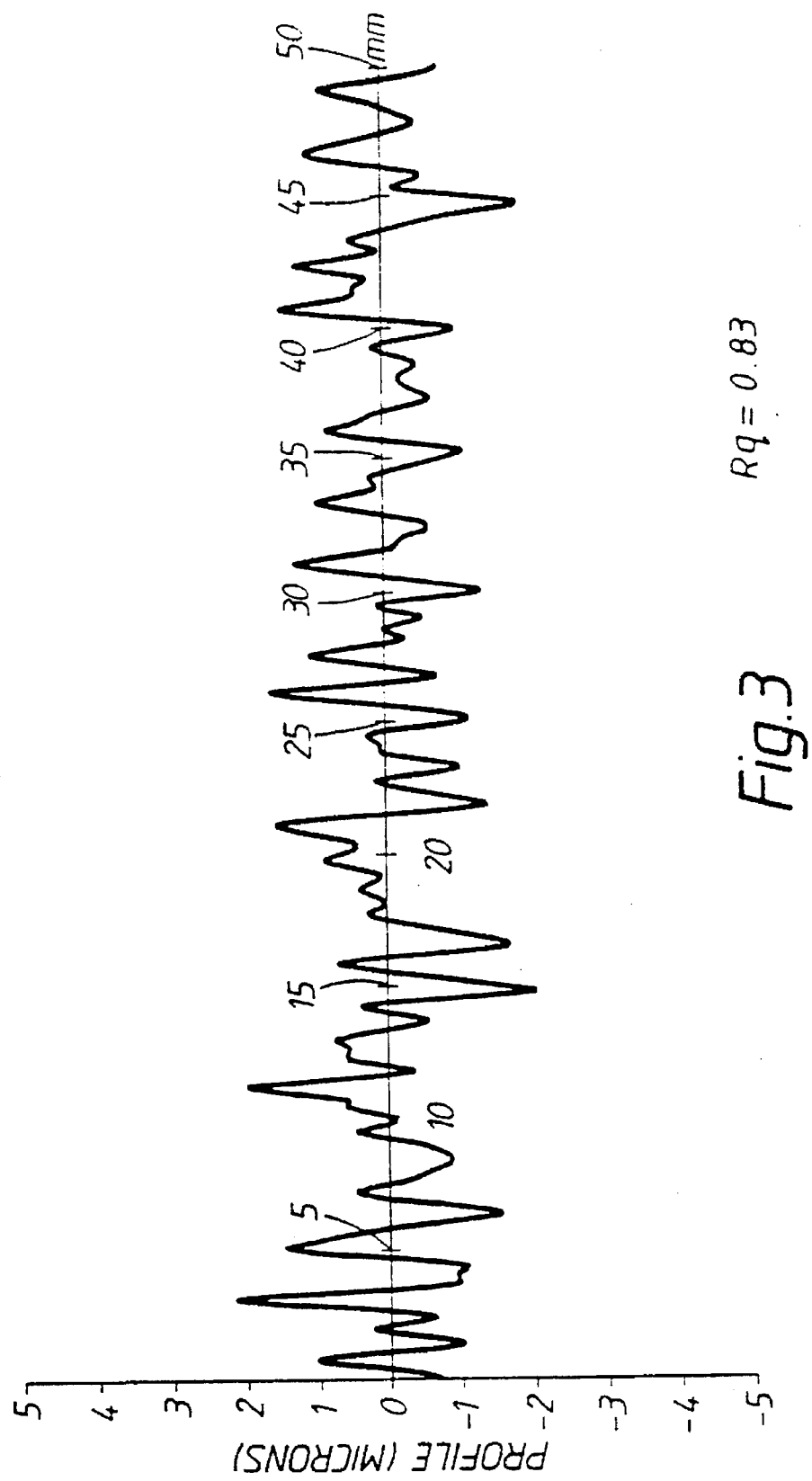
FIG. 3 shows the profilometer results of a cured film of 30 microns formed from the comparison "standard" powder described in Example (1)

The Rq value for the film formed from the standard (comparison) powder shows that the orange peel effect is more pronounced than that for FIG. 2, but not as exaggerated as that shown in FIG. 1. However, the Rq value for the size-reduced powder at 30 microns has an appearance broadly similar to that represented by FIG. 4.

The gel time of the powder and the physical and mechanical properties of the film were the same as the standard powder coating above.

Subsequently, the tribo charging (C/M ratio) of the standard and size-reduced powders was determined by connecting the discharging point on the gun to earth via a charge meter whilst measuring the throughput of the powder through the gun in grammes were minute. The results were as follows:

Standard powder=$(1.10\pm0.08)\times10^{-3}$ C/kg

Size reduced+1% Dry Blend Additive Composition 2=$(0.39\pm0.04)\times10^{-3}$ C/kg Example (8)

| High Flow Full Gloss System Formulation | |
|---|---|
| Special Black No. 6 | 1.50% |
| Acid Functional Polyester Resin | 82.00% |
| Primid XL552 | 3.40% |
| Antioxidant | 0.20% |
| Benzoin | 0.40% |
| Silica Absorbed Flow Aid | 1.50% |
| Blanc Fixe HD80 (precipitated barium sulfate) | 10.00% |
| Flow modifiers | 1.00% |

The ingredients were dry mixed and fed to a single-screw extruder blender operating at a temperature of 130° C. The extrudate was ground in an impact mill to produce a coarse powder with a particle size distribution as follows:

100%<180 µm
25%<20 µm
8%<10 µm
3%<5 µm
$D_v(50)$~55 µm

This powder was then further size reduced in an air jet mill (Alpine 100 AFG) to produce a powder with the following particle size distribution:

100%<23 µm
68%<10 µm
23%<5 µm
$D_v(50)$~8 µm

The fine powder was then dry blended using a low-shear technique with 1.0% of Dry Blend Additive Composition 2 and the resulting composition according to the invention was spray applied using a Gema-Volstatic MPS 1-L electrostatic gun onto aluminium panels to give a film with a thickness of 50–60 µm (cure: 15 minutes at 200° C.). The film was examined by laser profilometer and found to have the following value:

$Rq=0.24$

Subsequently, some of the raw jet-milled powder was low-shear blended with 1% of Dry Blend Additive Composition 3 and the resulting composition according to the invention was spray applied in an identical manner to the above sample to give a cured film of 50–60 µm. The flow and levelling of the cured film was determined using laser profilometry and found to have the following value:

$Rq=0.25$

Example (9)

| Ultra-thin Film Formulation | |
|---|---|
| Hydroxy functional Polyester resin | 93.37% |
| Powderlink 1174 | 4.83% |
| Catalyst | 0.40% |

| -continued | |
|---|---|
| Ultra-thin Film Formulation | |
| Benzoin | 0.20% |
| Flow Aid | 1.20% |

The ingredients were dry mixed in a blender and fed into a twin-screw extruder at 110° C. The extrudate was ground in an impact mill to produce a powder with a particle size distribution of 100%<200 microns.

The powder was then further size reduced using an Alpine jet mill (100AFG). The classifier speed was adjusted such that the maximum particle size produced was nominally 100%<15 microns. The particle size of the resultant powder was as follows:

100%<14 µm
93%<10 µm
43%<5 µm
$D_v(50)$~6.1 µm

This size reduced powder was then blended using a low-shear technique with a 1.0% by weight addition of Dry Blend Additive Composition 2.The resulting total composition according to the invention was then spray applied using a Gema-Volstatic MPS 1-L electrostatic gun onto aluminium panels to give a film of thickness 4–6 µm of uniform appearance (cure: 15 minutes, 180° C.). The coated panels were then immersed for 45 seconds in an acidified copper (II) sulphate solution in order to test the coherence of the film. No reaction was seen to occur between the acidified copper sulphate solution and the coated portion of the panel indicating that the film was coherent, without pinholes or a degree of porosity which would have allowed the acidified copper sulphate to attack the substrate.

Testing of Additives

The following experiments I, II and V to VII illustrate the evaluation of individual materials for use as additives in accordance with the invention, and experiments III, IV, VIII and IX illustrate the use of various additive combinations in accordance with the invention.

In experiments I to IV, colour analysis was not performed on stoved films. Instead, the colour analysis was performed on uncured powder corona-sprayed onto aluminium panels (7 cm×5 cm). The panels were sprayed until complete coverage of the substrate was achieved and then a glass microscope slide was placed over the sample to protect the powder. Colour analysis was carried out by presenting the glass slide face up to a spectro-photometer inspection port. In all cases the standard sample was taken to be that sprayed at −70 kV and the colour analysis identified the colour of the −30 kV applied sample in comparison to the −70 kV sample.

Additional analyses were made by examining panels coated by turning off the application voltage and spraying the powder mixtures separately onto aluminium panels at +20 kV and −20 kV potential, respectively. Each aluminium panel (7 cm×5 cm) was connected to a Brandenburg Alpha III DC supply unit.

In Experiments V to IX, the colour analysis was carried out on stored films as described.

The procedures illustrated in Experiments I to IX are believed to be of general application in the evaluation of materials for use as additives in combinations according to the invention, and in the evaluation of combinations of additives, and the principles underlying those procedures are accordingly considered to form a part of the invention. It will be appreciated that the details of the procedures (substrate panels, application voltages, mixing times, etc.) may be varied from those specifically described without departing from the underlying principles. In practice, in assessing the utility of additive materials, it will normally be sufficient to carry out only the −70 kV/−30 kV comparison, and the additional comparison at zero application voltage and ±20 kV substrates will not be needed.

The formulations used in Experiments I to IX were as follows:

| Red Polyester Powder Base | |
|---|---|
| Pigment Red 170 | 78 g |
| Filler (Barytes) | 60 g |
| Carboxylic Acid-Functional Polyester Resin | 791 g |
| Epoxide Functional Curing Agent | 59 g |
| Flow Modifiers | 6 g |
| Benzoin | 3 g |
| Carnauba Wax | 3 g |

The ingredients were dry mixed, and fed to a single-screw extruder. (Buss co-kneader PR46) operating at a temperature of 140° C. The extrudate was ground in an impact mill to produce a powder with a particle size of 100%<180 microns.

This powder was then further size reduced in an air jet mill (Alpine 400 AFG) to prepare a powder sample of which the particle size distribution by volume was as follows:

100%<11 microns
68%<5 microns
$D(v)_{50}$ 4.3 microns

| Blue Polyester Powder Base | |
|---|---|
| Monolitet Blue Pigment 3R type | 50 g |
| Filler (Barytes) | 91 g |
| Carboxylic Acid-Functional Polyester Resin | 778 g |
| Epoxide Functional Curing Agent | 60 g |
| Flow Modifiers | 15 g |
| Benzoin | 3 g |
| Carnauba Wax | 3 g |

The ingredients were dry mixed, and fed to a single-screw extruder (Buss co-kneader PR46) operating at a temperature of 140° C. The extrudate was ground in an impact mill to produce a powder with a particle size of 100%<180 microns.

This powder was then further size reduced in an air jet mill (Alpine 400 AFG) to prepare a powder sample of which the particle size distribution by volume was as follows:

100%<8 microns
72%<5 microns
$D(v)_{50}$ 4.3 microns

Experiment I 50 parts of the red polyester powder was mixed with 50 parts of the blue polyester powder and blended for 10 seconds in a Moulinex blender. The blended mixture was sprayed electrostatically at −30 kV and −70 kV application voltage onto aluminium panels. Electrostatic spraying was very difficult due to surging and blocking in the gun. The colour difference between the two panels was $\Delta E$ (D65)= 5.01. $\Delta A$ (D65) was 3.52 (redder).

The same powder mixture was also sprayed at individual aluminium panel electrodes at +20 kV and −20 kV, respectively, and the colour difference between the panels was $\Delta E$ (65)=13.15. $\Delta A$ (D65) was 7.69 (redder).

In order to evaluate the effect of aluminium oxide as an additive, a blended mixture of the powders was made as before and individual samples were mixed with various quantities of aluminium oxide C. Each sample was sprayed at −30 kV and −70 kV application voltage. The samples were also sprayed with no application voltage onto aluminium panel electrodes at ±20 kV. The colour analysis of the resulting coatings is set out in Table 1 below:

TABLE 1

| $Al_2O_3$ content | −30 kV Panels compared to −70 kV panel | | +VE electrode compared to −VE electrode | |
|---|---|---|---|---|
| | $\Delta E$ (D65) | $\Delta A$ | $\Delta E$ (D65) | $\Delta A$ |
| 0.0% | 5.01 Redder | 3.52 | 13.15 Redder | 7.69 |
| 0.05% | 3.07 Redder | 2.02 | 9.84 Redder | 7.13 |
| 0.1% | 0.84 Bluer | −0.38 | 2.04 Bluer | −0.94 |
| 0.2% | 2.48 Bluer | −1.56 | 6.75 Bluer | −4.05 |
| 0.3% | 2.73 Bluer | −1.35 | 9.48 Bluer | −5.57 |
| 0.6% | 2.74 Bluer | −1.70 | 6.96 Bluer | −4.18 |
| 1.0% | 1.95 Bluer | −1.30 | 4.30 Bluer | −2.18 |
| 2.5% | 1.94 Bluer | −0.31 | 1.09 Bluer | −0.31 |

The electrode panels show the positive and negative nature of the components of the powder mixture, the charges being generated by spontaneous tribocharging of the components. In the absence of the aluminium oxide additive, the blue polyester is deposited onto the negative electrode, indicating that it has itself picked up a positive charge by tribo interaction with the red polyester. The red polyester in turn is deposited onto the positive electrode indicating that it has acquired a negative tribo charge. This behaviour is also reflected in the variable voltage spray study which showed that, in the absence of the additive, the negative tribocharged (red) powder was preferentially deposited at −30 kV.

The colour analysis of the powders collected on the +VE and −VE electrodes at increasing proportions of the aluminium oxide additive (Table 1) indicates that the additive has the ability to change the relative tribo charging of the blue and red polyesters such that, at proportions of aluminium oxide of 0.1% w/w and above, the blue polyester now takes on a negative charge and is preferentially deposited on the positive electrode. This change in behaviour is also reflected in the variable voltage spray application where the blue polyester is now preferentially deposited at −30 kV.

The data from Table 1 is presented in FIG. 8 where the colour difference ($\Delta E$) between the panels is shown graphically against aluminium oxide concentration. For convenience the red colour difference is shown as a positive value and the blue colour difference as a negative value around a nul point which represent no colour difference between the panels. It can be seen from the graph that at a critical intermediate concentration of aluminium oxide additive between 0.05% and 0.1%, the reversal of tribo charging polarity becomes partially complete, with the result that equal numbers of red and blue polyester powder particles have positive and negative charge and electrostatic segregation is minimised. (As demonstrated by a $\Delta E$ of 0 or no more than±0.5). It appears, however, that this particular concentration of aluminium oxide is both very small (<0.1%)—hence insufficient to generate satisfactory powder fluidity—and very concentration dependent (i.e. there is little or no tolerance of the matching condition to small variations in aluminium oxide content).

Experiment II 50 parts of the red polyester powder was incorporated with 50 parts of the blue polyester powder and several additives were incorporated individually at a range of concentrations. Each sample was mixed for 10 seconds in a Moulinex blender. As in Experiment I, the samples were then electrostatically sprayed individually at −30 kV and −70 kV application voltage onto aluminium panels and also at 0 kV application voltage onto panels at ±20 kV. The colour analysis of the resulting coating is set out in Table 2 below.

TABLE 2

| Additive | −30 kV Panel compared to −70 kV panel | | +VE electrode compared to −VE electrode | |
|---|---|---|---|---|
| | Δ E (D65) | Δ A | Δ E (D65) | Δ A |
| ZnO* 1% w/w | 1.26 Redder | 0.85 | 4.42 Redder | 3.14 |
| ZnO 3% w/w | 0.68 Redder | 0.29 | 1.92 Redder | 1.66 |
| ZnO 10% w/w | 0.96 Bluer | 0.09 | 1.43 Bluer | −0.16 |
| *Aldrich, particle size <1 μm | | | | |
| CaO* 1% w/w | 1.62 Redder | 1.22 | 2.51 Redder | 1.39 |
| CaO 3% w/w | 1.73 Redder | 1.23 | 3.49 Bluer | −2.52 |
| CaO 10% w/w | 0.38 Redder | 0.30 | 1.85 Bluer | −1.31 |
| *BDH, all particles <10 μm | | | | |
| SiO$_2$* 1.5% w/w | 0.16 Bluer | −0.11 | 6.71 Redder | 4.44 |
| SiO$_2$ 3% w/w | 0.41 Bluer | −0.16 | 4.92 Redder | 2.94 |
| *Degussa, particle size 2 μm | | | | |
| Al(OH)$_3$ 0.8% w/w | 4.74 Redder | 3.43 | 19.06 Redder | 12.11 |
| Al(OH)$_3$ 3% w/w | 2.46 Redder | 1.79 | 4.02 Redder | 3.10 |
| Al(OH)$_3$ 10% w/w | 1.68 Redder | 1.21 | 1.10 Redder | 0.34 |
| MgCO$_3$ 1% w/w | 2.77 Redder | 1.92 | 2.64 Redder | 0.86 |
| MgCO$_3$ 3% w/w | 0.86 Redder | 0.46 | 6.20 Bluer | −4.34 |
| MgCO$_3$ 10% w/w | 2.08 Bluer | −1.31 | 5.06 Bluer | −2.16 |
| Mg$_3$(PO$_4$)$_2$ 1% w/w | 4.25 Redder | 3.12 | | |
| Mg$_3$(PO$_4$)$_2$ 3% w/w | 0.99 Redder | 0.42 | | |
| Mg$_3$(PO$_4$)$_2$ 10% w/w | 0.56 Bluer | −0.09 | | |
| Aluminium silicate 1% w/w | 5.04 Redder | 3.70 | 19.60 Redder | 13.46 |
| Aluminium silicate 3% w/w | 5.71 Redder | 3.96 | 12.62 Redder | 8.16 |
| Aluminium silicate 10% w/w | 2.76 Redder | 1.89 | 4.21 Redder | 2.39 |

The results show that each additive shows a definite trend towards cancelling segregation as the concentration of additive increases.

Experiment III 50 parts of the red polyester powder were mixed with 50 parts the blue polyester powder. To this mixture, 0.8% w/w aluminium hydroxide was added and aluminium oxide was added such that a series of samples was produced with concentration 0.2%, 0.3%, 0.4% and 0.6% aluminium oxide (w/w). Each sample was electrostatically sprayed at −30 kV and −70 kV and also sprayed at 0 kV onto positive and negative electrodes (±20 kV). The colour analysis of the resulting coatings is set out in Table 3.

TABLE 3

| Al (OH)$_3$ (0.8% w/w) + Al$_2$O$_3$ at concentrations | −30 kV panels compared to −70 kV panel | | +VE electrode compared to −VE electrode | |
|---|---|---|---|---|
| | Δ E (D65) | Δ A | Δ E (D65) | Δ A |
| 0% | 4.74 Redder | 3.43 | 19.06 Redder | 12.11 |
| 0.2% | 0.43 Redder | 0.27 | 1.63 Redder | 1.45 |

TABLE 3-continued

| Al (OH)$_3$ (0.8% w/w) + Al$_2$O$_3$ at concentrations | −30 kV panels compared to −70 kV panel | | +VE electrode compared to −VE electrode | |
|---|---|---|---|---|
| | Δ E (D65) | Δ A | Δ E (D65) | Δ A |
| 0.3% | 0.53 Bluer | −0.20 | 3.40 Bluer | −1.87 |
| 0.4% | 0.71 Bluer | −0.28 | 4.47 Bluer | −2.80 |
| 0.6% | 0.43 Bluer | −0.20 | 2.69 Bluer | −1.57 |

The data from Table 3 is presented in FIG. 9 where the colour difference (Δ E) between the panels is shown graphically against aluminium oxide concentration. For convenience the red colour difference is shown as a positive value and the blue colour difference as a negative value around a nul point which represents no colour difference between the panels.

It can be seen from FIG. 9 that, when compared with the use of aluminium oxide alone (Experiment I), the addition of 0.8% (w/w) aluminium hydroxide a) increases the amount of aluminium oxide to be added for the matching condition (i.e. to between 0.2% and 0.3% w/w) and b) moderates segregation effects over the full concentration range of aluminium oxide.

These effects are clearly demonstrated in FIG. 10 which compares the results from Experiment I and Experiment III for the samples sprayed electrostatically at −30 kV and −70 kV.

Accordingly, in order to obtain the full benefit of the use of combinations of additives in accordance with the invention, it is considered that one or both components must reduce the tendency for a powder mixture to segregate in the manner explained above and that the second component must lessen the dependence of the matching condition on variations in additive concentration.

Experiment IV 50 parts of the red polyester powder was added to 50 parts of the blue polyester powder, and different additives and additive combinations were incorporated as shown in Table 4 below. Each sample was mixed in a Moulinex blender and sprayed as described in Experiments I to III. The colour analysis of the resulting coatings is given in Table 4.

TABLE 4

| Additive or Combination | −30 kV panel compared to −70 kV panel | | +VE electrode compared to −VE electrode | |
|---|---|---|---|---|
| | Δ E (D65) | Δ A | Δ E (D65) | Δ A |
| ZrO$_2$* 1.5% | 2.99 Redder | 1.58 | 12.04 Redder | 7.74 |
| ZrO$_2$ 1.5% + 0.2% Al$_2$O$_3$ | 0.76 Bluer | −0.02 | 2.05 Bluer | −0.97 |
| ZrO$_2$ 1.5% + 0.4% Al$_2$O$_3$ | 0.3 Bluer | −0.26 | 2.92 Bluer | −0.78 |
| SiO$_2$ 1.5% | 0.16 Bluer | −0.11 | 6.71 Redder | 4.44 |
| SiO$_2$ 1.5% + Al$_2$O$_3$ 0.2% | 0.27 Redder | 0.0 | 1.42 Redder | 0.95 |
| SiO$_2$ 1.5% + Al$_2$O$_3$ 0.4% | 0.34 Bluer | −0.15 | 2.7 Bluer | −1.44 |
| ZnO 1% | 1.26 Redder | 0.85 | 4.42 Redder | 3.14 |
| ZnO 1% + 0.2% Al$_2$O$_3$ | 0.59 Bluer | −0.15 | 3.74 Bluer | −1.59 |
| ZnO 1% + | 0.54 Bluer | −0.31 | 5.66 Bluer | −3.12 |

TABLE 4-continued

| Additive or Combination | −30 kV panel compared to −70 kV panel | | +VE electrode compared to −VE electrode | |
|---|---|---|---|---|
| | Δ E (D65) | Δ A | Δ E (D65) | Δ A |
| 0.4% Al$_2$O$_3$ | | | | |
| CaO 3% | 1.73 Redder | 1.23 | 3.49 Bluer | −2.52 |
| CaO 3% + 0.2% Al$_2$O$_3$ | 1.37 Bluer | −0.56 | 3.88 Bluer | −2.24 |
| CaO 3% + 0.4% Al$_2$O$_3$ | 0.66 Bluer | −0.28 | 2.56 Bluer | −1.60 |
| Aluminium silicate 1% | 5.04 Redder | 3.70 | 19.60 Redder | 13.46 |
| +0.2% Al$_2$O$_3$ | 1.4 Redder | 1.05 | 2.32 Redder | 2.05 |
| +0.4% Al$_2$O$_3$ | 0.87 Bluer | −0.23 | 2.53 Bluer | −1.08 |

*Aldrich: particle size <5 μm

It will be seen that each of the additive combinations tested exhibited the general characteristics outlined in the discussion of Experiment III above.

Experiment V 50 parts of red epoxy polyester was mixed with 50 parts of white epoxy polyester and blended for 10 seconds in a Moulinex blender. The blended mixture was sprayed electrostatically at −30 kV and −70 kV application voltage onto aluminium panels. The panels were then stoved at 200° C. for 15 minutes. Electrostatic spraying was very difficult due to surging and blocking in the gun. The colour difference between the two panels was Δ E (D65)=4.55 and the chroma difference Δ C (D65)=3.66 (redder).

The same powder mixture was also sprayed at individual aluminium panel electrodes at +20 kV and −20 kV respectively and the colour difference between the panels was Δ E (D65)=18.19 and the chroma difference Δ C (D65)=12.89 (redder).

In order to evaluate the effect of aluminium oxide as an additive, a blended mixture of the powders was made as before and individual samples were mixed with two different concentrations of aluminium oxide C. Each sample was sprayed at −30 kV and −70 kV application voltages. The samples were also sprayed with no application voltage onto individual aluminium panel electrodes at +20 kV and −20 kV, respectively. The colour analysis of the resulting coatings is set out in Table 5 below.

TABLE 5

| Al$_2$O$_3$ content | −30 kV Panel compared to −70 kV panel | | +ve electrode compared to −ve electrode | |
|---|---|---|---|---|
| | Δ E | Δ C (D65) | Δ E | Δ C (D65) |
| 0% | 4.55 | 3.66 Redder | 18.19 | 12.89 Redder |
| 0.05% | 4.33 | −2.52 Whiter | 6.86 | −2.65 Whiter |
| 0.1% | 5.63 | −3.52 Whiter | 9.16 | −4.10 Whiter |

The electrode panels show the positive and negative nature of the components of the powder mixture. In the absence of the aluminium oxide additive, the white epoxy polyester is deposited onto the negative electrode, indicating that it has itself picked up a positive charge by tribo interaction with the red epoxy polyester. The red epoxy polyester in turn is deposited onto the positive electrode indicating that it has acquired a negative tribo charge. This behaviour is also reflected in the variable voltage spray study which showed that, in the absence of the additive, the negative tribo-charged (red) powder was preferentially deposited at −30 kV.

The colour analysis of the powders collected on the +ve and −ve electrodes at increasing proportions of the aluminium oxide additive (Table 5) indicates that the additive has the ability to change the relative tribo-charging of the white and red epoxy polyesters such that, at proportions of aluminium oxide of 0.05% w/w and above, the white epoxy polyester now takes on a negative charge and is preferentially deposited on the positive electrode. This change in behaviour is also reflected in the variable voltage spray application where the white epoxy polyester is now preferentially deposited at −30 kV.

Experiment VI 50 parts of the red epoxy polyester powder was incorporated with 50 parts of the white epoxy polyester powder and several additives were incorporated individually at different concentrations. Each sample was mixed for 10 seconds in a Moulinex Blender. As in Experiment V, the samples were then electrostatically sprayed individually at −30 kV and −70 kV application voltage onto aluminium panels and also at 0 kV application voltage onto panels at ±20 kV. All panels were stored at 200° C. for 15 minutes. The colour analysis of the resulting coatings is set out in Table 6 below.

TABLE 6

| Additive | | −30 kV Panel compared to −70 kV panel | | +ve electrode compared to −ve electrode | |
|---|---|---|---|---|---|
| | | Δ E | Δ C (D65) | Δ E | Δ C (D65) |
| No additive | | 4.55 | 3.66 Redder | 18.19 | 12.89 Redder |
| Al(OH)$_3$ | 5% | 1.99 | 0.09 Redder | 4.66 | 4.49 Redder |
| SiO$_2$ | 1% | 4.61 | 3.04 Redder | 15.77 | 11.04 Redder |
| | 2% | 1.01 | −0.34 Whiter | — | |
| MgCO$_3$ | 2% | 1.35 | −0.19 Whiter | 3.89 | −1.99 Whiter |
| | 5% | 2.27 | −1.98 Whiter | — | |
| CeO$_2$ | 5% | 1.51 | 1.48 Redder | — | |
| | 8% | 1.35 | −0.38 Whiter | 5.32 | −3.96 Whiter |
| ZrO$_2$ | 3% | 1.98 | 1.83 Redder | 13.69 | 9.19 Redder |
| | 10% | 1.67 | 1.50 Redder | 5.32 | 2.93 Redder |
| WO$_3$ | 5% | 7.54 | 5.60 Redder | 14.69 | 7.13 Redder |
| | 10% | 1.58 | 0.81 Redder | 11.90 | 5.58 Redder |
| CaO | 5% | 2.96 | 1.98 Redder | 4.75 | 2.55 Redder |
| | 10% | 2.77 | 2.29 Redder | 2.55 | −1.04 Whiter |
| Aluminium Silicate | 5% | 1.39 | 1.05 Redder | 10.69 | 7.09 Redder |
| | 8% | 1.55 | −0.20 Whiter | 8.00 | 6.35 Redder |
| ZnO | 2% | 1.58 | 1.30 Redder | 5.11 | −2.58 Whiter |
| | 5% | 3.67 | −2.25 Whiter | 7.45 | −4.38 Whiter |
| Mg$_3$(PO$_4$)$_2$ | 3% | 2.95 | 2.25 Redder | 4.95 | 2.15 Redder |
| | 8% | 0.94 | −0.59 Whiter | 5.88 | −5.08 Whiter |
| Zinc Borate | 5% | 2.86 | 1.37 Redder | 4.18 | 1.74 Redder |
| | 10% | 4.44 | 2.93 Redder | — | |
| BaTiO$_3$ | 3% | 4.47 | 2.99 Redder | 7.56 | 13.88 Redder |
| | 8% | 1.86 | 1.78 Redder | 7.41 | 8.16 Redder |
| MoO$_3$ | 5% | 2.61 | 2.38 Redder | 15.02 | 9.53 Redder |

The results show that each additive shows a definite trend towards cancelling segregation at the concentration given or, as the concentration increases.

Experiment VII

To further exemplify the effect of aluminium oxide on the electrostatic spray behaviour of powders in mixtures, 50 parts of a red polyester was mixed with 50 parts of blue polyester, and blended for 10 seconds in a Moulinex blender. The blended mixture was sprayed electrostatically at −30 kV and −70 kV application voltages onto aluminium panels.

The panels were stoved at 200° C. for 15 minutes. The colour difference between the two panels was Δ E (D65)= 2.69 and Δ A (D65)=0.71 (redder).

The same powder mixture was also sprayed at individual aluminium panel electrodes at +20 kV a −20 kV respectively, and the colour difference between the panels was Δ E (D65)=8.30 and Δ A (D65)=6.3 (redder).

To show the effect of aluminium oxide as an additive, a blended mixture of the powders was made as before and individual samples were mixed with various quantities of aluminium oxide C. Each sample was sprayed at −30 kV and −70 kV application voltage. The samples were then stoved at 200° C. for 15 minutes. The samples were also sprayed at no application voltage onto aluminium panel electrodes at ±20 kV. The electrodes were stoved at 200° C. for 15 minutes. The colour analysis of the resulting coatings is set out in Table 7.

TABLE 7

| $Al_2O_3$ content | −30 kV Panel compared to −70 kV panel | | +ve electrode compared to −ve electrode | |
| --- | --- | --- | --- | --- |
| | Δ E | Δ A | Δ E | Δ A |
| 0.0% | 2.69 | 0.71 Redder | 8.30 | 6.3 Redder |
| 0.1% | 0.49 | −0.34 Bluer | 6,11 | −5.11 Bluer |
| 0.2% | 1.06 | −0.86 Bluer | 2.54 | −0.22 Bluer |
| 0.6% | 2.63 | −2.12 Bluer | 8.65 | −7.01 Bluer |
| 1.0% | 2.35 | −2.31 Bluer | 5.44 | −2.55 Bluer |

The electrode panels show the positive and negative nature of the components of the powder mixture. In the absence of the aluminium oxide additive, the blue polyester is deposited onto the negative electrode, indicating that it has itself picked up a positive charge by tribo interaction with the red polyester. The red polyester in turn is deposited onto the positive electrode indicating that it has acquired a negative tribo charge. This behaviour is also reflected in the variable voltage spray study which showed that, in the absence of the additive, the negative tribo-charged (red) powder was preferentially deposited at −30 kV.

The colour analysis of the powders collected on the +VE and −VE electrodes at increasing proportions of the aluminium oxide additive (Table 7) indicates that the additive has the ability to change the relative tribo charging of the blue and red polyesters such that, at proportions of aluminium oxide of 0.1% w/w and above, the blue polyester now takes on a negative charge and is preferentially deposited on the positive electrode. This change in behaviour is also reflected in the variable voltage spray application where the blue polyester is now preferentially deposited at −30 kV. It is believed that, at a critical intermediate concentration of aluminium oxide additive between 0.0% and 0.1%, the reversal of tribo charging polarity becomes partially complete, with the result that equal numbers of red and blue polyester powder particles have positive and negative charge and electrostatic segregation is minimised. It appears, however, that this particular concentration of aluminium oxide is both very small (<0.1%)—hence insufficient to generate satisfactory powder fluidity—and very concentration dependent (i.e. there is little or no tolerance of the matching condition to small variations in aluminium oxide content).

Experiment VIII 50 parts of a red polyester powder were mixed with 50 parts of a blue polyester powder. To this mixture, different concentrations of an additive mixture of aluminium oxide and aluminium hydroxide were added.

The additive mixture was made by blending aluminium oxide and aluminium hydroxide (relative concentrations 10% w/w:90% w/w) in a Moulinex blender for 1 minute. The additive mixture was then added in concentrations of 1, 2 and 3% w/w to the mixture of red and blue polyester powders to give $Al_2O_3$ concentrations of 0.1%, 0.2% and 0.3% w/w respectively. Each sample was blended for 10 seconds in a Moulinex blender and sprayed at −30 kV and −70 kV. The samples were stoved at 200° C. for 15 minutes and the colour analysis of the resulting coatings is given in Table 8.

TABLE 8

| $Al(OH)_3/Al_2O_3$ (90:10) | −30 kV Panel compared to −70 kV panel | |
| --- | --- | --- |
| concentrations | Δ E | Δ A |
| 0% | 2.69 | 0.71 Redder |
| 1% (0.1% $Al_2O_3$) | 1.16 | 1.09 Redder |
| 2% (0.2% $Al_2O_3$) | 0.25 | 0.00 Redder |
| 3% (0.3% $Al_2O_3$) | 0.47 | 0.32 Redder |

As compared with the use of aluminium oxide alone, the mixing of the aluminium hydroxide with the aluminium oxide:

a) increases the amount of aluminium oxide to be added for the matching condition (i.e. to >0.3% w/w) and b) moderates segregation effects over the concentration range of aluminium oxide.

Accordingly, in order to obtain the full benefit of the use of combinations of additives in accordance with the invention, it is considered that one or both components must reduce the tendency for a powder mixture to segregate in the manner explained above and that the second component must lessen the dependence of the matching condition on variations in additive concentration.

Experiment IX 50 parts of the red polyester powder was added to 50 parts of the blue polyester powder, and different additives and additive mixtures were incorporated as shown in Table 4 below. All additives were made by blending the relative proportions of the two components shown in the Table, for 1 minute in a Moulinex blender. The additive was then mixed into the red and blue polyester powder mixture using a Moulinex blender for 10 seconds. The samples were sprayed at −30 kV and −70 kV onto aluminium panels which were stoved at 200° C. for 15 minutes. The colour analysis is set out in Table 9 below.

TABLE 9

| Additive or Combination | −30 kV panel compared to −70 kV panel | |
| --- | --- | --- |
| | Δ E | Δ A |
| $Al_2O_3/SiO_2$ Mixture (20%:80%) | | |
| 1% (0.2% $Al_2O_3$) | 0.59 | −0.16 Bluer |
| 2% (0.4% $Al_2O_3$) | 0.37 | 0.01 Redder |
| $Al_2O_3$/ZnO Mixture (20%:80%) | | |
| 1% (0.2% $Al_2O_3$) | 1.31 | −0.93 Bluer |
| 2% (0.4% $Al_2O_3$) | 0.79 | −0.57 Bluer |

TABLE 9-continued

| Additive or Combination | -30 kV panel compared to -70 kV panel | |
|---|---|---|
| | ΔE | ΔA |
| Al₂O₃/MgCO₃ Mixture (20%:80%) | | |
| 1% (0.2% Al₂O₃) | 1.17 | 0.14 Redder |
| 2% (0.4% Al₂O₃) | 0.20 | 0.01 Redder |
| Al₂O₃/Aluminium Silicate Mixture (60%:40%) | | |
| 1% (0.6% Al₂O₃) | 0.80 | 0.61 Redder |
| 1.5% (0.9% Al₂O₃) | 0.58 | -0.34 Bluer |
| Al₂O₃/CeO₂ Mixtures (10%:90%) | | |
| 2% (0.2% Al₂O₃) | 1.00 | -0.84 Bluer |
| 3% (0.3% Al₂O₃) | 1.02 | -0.29 Bluer |
| Al₂O₃/WO₃ Mixtures (10%:90%) | | |
| 2% (0.2% Al₂O₃) | 0.66 | -0.06 Bluer |
| 3% (0.3% Al₂O₃) | 0.26 | 0.13 Redder |
| Al₂O₃/Mg₃(PO₄)₂ Mixture (10%:90%) | | |
| 1% (0.1% Al₂O₃) | 1.55 | 0.99 Redder |
| 3% (0.3% Al₂O₃) | 1.37 | -0.19 Bluer |
| Al₂O₃/ZrO₂ Mixtures (20%:80%) | | |
| 1% (0.2% Al₂O₃) | 0.92 | -0.54 Bluer |
| 2% (0.4% Al₂O₃) | 0.62 | -0.48 Bluer |
| Al₂O₃/Zinc Borate (10%:90%) | | |
| 1% (0.1% Al₂O₃) | 1.76 | 0.18 Redder |
| Al₂O₃/BaTiO₃ (20%:80%) | | |
| 1% (0.2% Al₂O₃) | 0.95 | -0.51 Bluer |
| Al₂O₃/CaO (10%:90%) | | |
| 2% (0.2% Al₂O₃) | 0.66 | -0.27 Bluer |

We claim:

1. A powder coating composition which comprises at least one film-forming polymeric material and which has dry-blended therewith two or more additives selected from the group consisting of solid, particulate, inorganic, water-insoluble materials which may be ceramic or mineral materials and/or may be oxides, mixed oxides, hydrated oxides, hydroxides, oxide-hydroxides or oxysalts of metals and metalloids, at least 95% by volume of the powder coating composition having a particle size not exceeding 50 microns.

2. A powder coating composition as claimed in claim 1, wherein at least 20% by volume of the powder coating composition has particle size of 10 microns or less.

3. A powder coating composition as claimed in claim 1, wherein from 95 to 100% by volume of the powder coating composition has a particle size of less than 50 microns.

4. A powder coating composition as claimed in claim 1, wherein from 45 to 100% by volume of the powder coating composition has a particle size of less than 20 microns.

5. A powder coating composition as claimed in claim 1, wherein from 20 to 100% by volume of the powder coating composition has a particle size of less than 10 microns.

6. A powder coating composition as claimed in claim 1, wherein from 5 to 70% by volume of the powder coating composition has a particle size of less than 5 microns.

7. A powder coating composition as claimed in claim 1, wherein the diameter in microns below which 50% of the volume distribution of the particles of a sample of the powder coating composition is in the range of from 1.3 to 20 microns.

8. A powder coating composition as claimed in claim 1, wherein the particle size distribution by volume of the powder coating compositions is any of the following:

| ≧95%, or | ≧99%, or | 100% |
|---|---|---|
| <45μ | <45μ | <45μ |
| <40μ | <40μ | <40μ |
| <35μ | <35μ | <35μ |
| <30μ | <30μ | <30μ |
| <25μ | <25μ | <25μ |
| <20μ | <20μ | <20μ |
| <15μ | <15μ | <15μ |
| <10μ | <10μ | <10μ. |

9. A powder coating composition as claimed in claim 1, wherein one or each dry-blended additive is an oxide or mixed oxide.

10. A powder coating composition as claimed in claim 1, wherein the dry-blended additives comprise an oxide or mixed oxide with a hydrated oxide, hydroxide or oxide-hydroxide.

11. A powder coating composition as claimed in claim 1, wherein the dry-blended additives comprise:
(A) an additive selected from the group consisting of alumina, aluminum hydroxide, calcium oxide, silica, zinc oxide, zirconia, molybdenum trioxide, ceric oxide and tungsten trioxide; and
(B) an additive selected from the group consisting of aluminum hydroxide, aluminum silicate, zirconia, zinc oxide, silica and calcium oxide provided additives (A) and (B) are different.

12. A powder coating composition as claimed in claim 1, wherein one of the dry-blended additives is alumina.

13. A powder coating composition as claimed in claim 12, wherein the dry-blended additives comprise alumina and aluminium hydroxide.

14. A powder coating composition as claimed in claim 12, wherein the dry-blended additives comprise alumina and aluminium silicate.

15. A powder coating composition as claimed in claim 1, wherein the total content of the dry-blended additives incorporated with the powder coating composition is in the range of from 0.01 to 10% by weight based on the total weight of the composition without the additives.

16. A powder coating composition as claimed in claim 1, wherein one of the dry-blended additives is alumina and the content of alumina is at least 0.01% by weight based on the total weight of the composition without the additives.

17. A powder coating composition as claimed in, claim 1 wherein one of the dry-blended additives is alumina and the total content of the other additive(s) does not exceed 5% of the total weight of the composition without the additives.

18. A powder coating composition as claimed in claim 1, wherein the particle size of each dry-blended additive does not exceed 5 microns.

19. A powder coating composition as claimed in claim 1, wherein the composition comprises a single powder coating component (film-forming polymer, curing agent, where appropriate, and optionally one or more colouring agents).

20. A powder coating composition as claimed in claim 1, wherein the composition comprises a mixture of two or more powder coating components (each comprising a film-forming polymer, curing agent, where appropriate, and optionally one or more colouring agents).

21. A powder coating composition as claimed in claim 20, wherein each powder coating component is differently coloured.

22. A powder coating composition as claimed in claim 1, wherein the or each film-forming polymer is selected from the group consisting of carboxy-functional polyester resins, hydroxy-functional polyester resins, epoxy resins and functional acrylic resins.

23. A process for forming a coating on a substrate, which comprises applying a composition with dry-blended additives according to claim 1 to a substrate by an electrostatic spray coating process, and heating the applied composition to melt and fuse the particles and cure the coating.

24. The substrate coated by a process of claim 23, wherein the thickness of the applied coating is 30 microns or less.

25. A substrate coated by the process of claim 23.

26. A powder coating composition as claimed in claim 2 wherein at least 30% by volume of the powder coating composition has a particle size of 10 microns or less.

27. A powder coating composition as claimed in claim 26 wherein at least 40% by volume of the powder coating composition has a particle size of 10 microns or less.

28. A powder coating composition as claimed in claim 27 wherein at least 50% by volume of the powder coating composition has a particle size of 10 microns or less.

29. A powder coating composition as claimed in claim 15, wherein the total content of the dry-blended additives incorporated with the powder coating composition is at least 0.05% by weight.

30. A powder coating composition as claimed in claim 29, wherein the total content of the dry-blended additives incorporated with the powder coating composition is at least 1.0% weight.

31. A powder coating composition as claimed in claim 16, wherein the content of the alumina is at least 0.02% weight.

32. A powder coating composition as claimed in claim 17, wherein the content of the alumina is in the range 0.2 to 0.4% weight.

33. A powder coating composition as claimed in claim 31, wherein the content of the other additive does not exceed 3% by weight.

34. A powder coating composition as claimed in claim 18, wherein the particle size of each additive does not exceed 2 microns.

35. A powder coating composition as claimed in claim 34, wherein the particle size of each additive does not exceed 1 micron.

* * * * *